United States Patent
Inaba et al.

(10) Patent No.: US 12,304,830 B2
(45) Date of Patent: May 20, 2025

(54) POROUS OXIDE SEMICONDUCTOR PARTICLES

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Masanori Inaba, Nagakute (JP); Kazuhisa Yano, Nagakute (JP); Tomohiro Takeshita, Nagakute (JP); Kensaku Kodama, Nagakute (JP); Toshiyuki Suzuki, Toyota (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/036,728

(22) PCT Filed: Oct. 14, 2021

(86) PCT No.: PCT/JP2021/038012
§ 371 (c)(1),
(2) Date: May 12, 2023

(87) PCT Pub. No.: WO2022/102333
PCT Pub. Date: May 19, 2022

(65) Prior Publication Data
US 2023/0406720 A1    Dec. 21, 2023

(30) Foreign Application Priority Data
Nov. 12, 2020   (JP) .................... 2020-188847

(51) Int. Cl.
*C01G 19/02* (2006.01)
*C01G 30/00* (2006.01)
*H01M 8/10* (2016.01)

(52) U.S. Cl.
CPC .......... *C01G 19/02* (2013.01); *C01G 30/00* (2013.01); *H01M 8/10* (2013.01);
(Continued)

(58) Field of Classification Search
CPC ........................................ C01G 19/02
See application file for complete search history.

(56) References Cited

U.S. PATENT DOCUMENTS

| 9,871,248 B2 * | 1/2018 | Rayner ............. H01M 4/134 |
| 2021/0273239 A1 * | 9/2021 | Mogi ............. H01M 8/1004 |
| 2021/0339224 A1 * | 11/2021 | Arata ............. H01M 4/925 |

FOREIGN PATENT DOCUMENTS

| JP | 2003-036856 A | 2/2003 |
| JP | 2006-152249 A | 6/2006 |

(Continued)

OTHER PUBLICATIONS

Feb. 6, 2024 Office Action Issued in Japanese Patent Application No. 2022-045239.

(Continued)

*Primary Examiner* — William D Young
(74) *Attorney, Agent, or Firm* — Oliff PLC

(57) ABSTRACT

Porous oxide semiconductor particles have a connected structure in which porous primary particles having an aggregate of crystallites composed of an oxide semiconductor are connected to each other and have a specific surface area of 60 m²/g or more. The porous oxide semiconductor particles have preferably a pore diameter of 1 nm or more and 20 nm or less. The porous oxide semiconductor particles have preferably a tap density of 0.005 g/cm³ or more and 1.0
(Continued)

g/cm$^3$ or less. The oxide semiconductor is preferably SnO$_2$ or SnO$_2$ doped with at least one element selected from the group consisting of Nb, Sb, W, Ta, and Al.

9 Claims, 9 Drawing Sheets

(52) U.S. Cl.
CPC ....... *C01P 2002/60* (2013.01); *C01P 2006/11* (2013.01); *C01P 2006/14* (2013.01); *C01P 2006/16* (2013.01); *C01P 2006/40* (2013.01)

(56) References Cited

FOREIGN PATENT DOCUMENTS

| | | |
|---|---|---|
| JP | 2010-120800 A | 6/2010 |
| JP | 2013-216811 A | 10/2013 |
| JP | 2017-183273 A | 10/2017 |
| JP | 2021-084852 A | 6/2021 |
| WO | 2009/060582 A1 | 5/2009 |
| WO | 2011/065471 A1 | 6/2011 |
| WO | 2012/088166 A1 | 6/2012 |
| WO | 2015/050046 A1 | 4/2015 |

OTHER PUBLICATIONS

Ott et al., "Ionomer distribution control in porous carbon-supported catalyst layers for high-power and low Pt-loaded proton exchange membrane fuel cells," Nature Materials, Jan. 2020, vol. 19, pp. 77-85.

Arai et al., "Study of Oxide Supports for PEFC Catalyst," SAE Int. J. Alt. Power, May 2017, vol. 6, Issue 1, pp. 145-150.

He et al., "Self-Anchored Platinum-Decorated Antimony-Doped-Tin Oxide as a Durable Oxygen Reduction Electrocatalyst," ACS Catalysis, 2021, vol. 11, pp. 7006-7017.

Jalalpoor et al., "The Impact of Antimony on the Performance of Antimony Doped Tin Oxide Supported Platinum for the Oxygen Reduction Reaction," Journal of The Electrochemical Society, 2021, vol. 168, 024502.

Takasaki et al., "Carbon-Free Pt Electrocatalysts Supported on SnO2 for Polymer Electrolyte Fuel Cells: Electrocatalytic Activity and Durability," Journal of The Electrochemical Society, 2011, vol. 158, No. 10, pp. B1270-B1275.

Kakinuma et al., "Electronic States and Transport Phenomena of Pt Nanoparticle Catalysts Supported on Nb-Doped SnO2 for Polymer Electrolyte Fuel Cells," ACS Applied Materials & Interfaces, 2019, vol. 11, pp. 34957-34963.

Wang et al., "Synthesis of Mesoporous SnO2 Spheres and Application in Gas Sensors," European Journal of Inorganic Chemistry, 2014, pp. 863-869.

Dec. 21, 2021 International Search Report issued in International Patent Application No. PCT/JP2021/038012.

Dec. 21, 2021 Written Opinion of the International Searching Authority issued in International Patent Application No. PCT/JP2021/038012.

U.S. Appl. No. 18/184,409, filed Mar. 15, 2023 in the name of Masanori Inaba et al.

\* cited by examiner

CSC

CMTO

300°C

500°C

POROUS OXIDE SEMICONDUCTOR PARTICLES

FIELD OF THE INVENTION

The present invention relates to porous oxide semiconductor particles and more specifically to porous oxide semiconductor particles having a connected structure and a relatively high specific surface area.

BACKGROUND OF THE INVENTION

A polymer electrolyte fuel cell (PEFC) has a membrane electrode assembly (MEA) in which a catalyst layer is bonded to both sides of an electrolyte membrane. A gas diffusion layer is usually arranged outside a catalyst layer. Further, a current collector (separator) with a gas flow path is arranged outside the gas diffusion layer. PEFC usually has a structure (a fuel cell stack) in which a plurality of unit cells, each of the unit cells including such an MEA, gas diffusion layers, and current collectors, are stacked.

In PEFC, the catalyst layer is usually composed of a mixture of an electrode catalyst having catalyst metal fine particles such as platinum supported on the surface of a support and a catalyst layer ionomer. As a catalyst support, carbon materials such as carbon black and acetylene black are usually used. It has however been known that the carbon support exposed to a high potential causes oxidation corrosion and the catalyst metal fine particles supported on the support fall off and thereby the electrode inevitably has deteriorated performance. Therefore, use of a conductive metal oxide stable at a high potential has been proposed as a support material.

For example, Non-Patent Literature 1 discloses that:
(a) among various conductive metal oxides, a nonstoichiometric titanium oxide (TiOx) or tin oxide doped with a foreign element (such as Nb or Sb) is promising as a catalyst support, and
(b) particularly for a catalyst support for the cathode of PEFC, tin oxide stable under strongly acidic and high-potential environments is promising.

Non-Patent Literature 2 discloses a catalyst support prepared by a coprecipitation method, composed of Nb, Sb, or Al-doped $SnO_2$, having a BET specific surface area of 50 $m^2/g$ or less, and having a conductivity of about $1.0 \times 10^{-5}$ to $1.0 \times 10^{-4}$ S/cm.

Patent Literature 1 discloses an electrode catalyst including a support composed of Sb- and Ta-containing tin oxide particles, a coating layer composed of an aggregate of fluorine-containing tin oxide fine particles for coating the surface of the support, and a platinum nickel alloy supported on the surface of the coating layer.

Non-Patent Literature 3 discloses a catalyst support obtained by spraying a precursor into a flame, composed of Nb-doped $SnO_2$, having a BET specific surface area of 40 $m^2/g$, and having a conductivity of a green compact of $1.0 \times 10^{-4}$ S/cm.

Non-Patent Literature 4 discloses porous $SnO_2$ particles having a BET specific surface area of 78.8 $m^2/g$ and a pore diameter of 10 nm, though they are not a catalyst support for PEFC.

Further, Patent Literature 2 discloses a spherical $SnO_2$ porous body obtained by precipitating $SnO_2$ in the pore of a spherical carbon porous body and removing the spherical carbon porous body, having a monodispersity of 4.8%, and having a BET specific surface area of 103 $m^2/g$, though they are not a catalyst support for PEFC.

In PEFC, with deterioration in electronic conductivity of a catalyst layer, an overvoltage occurs when catalyst metal fine particles are supplied with electrons necessary for the reaction. A catalyst support for PEFC is therefore required to have high electronic conductivity.

In addition, the catalyst support for PEFC is required to have:
(a) a large specific surface area in order to improve the dispersibility of catalyst metal fine particles,
(b) a structure which allows to form adequate voids in a catalyst layer in order to smoothen the transfer of a material (the diffusion of a reactant gas or discharge of generated water) in the catalyst layer when the catalyst support is used for the catalyst layer, and
(c) mesopores of a size (10 nm or less) enough for supporting catalyst metal fine particles therein in order to prevent a catalyst from being poisoned by a catalyst layer ionomer.

The "structure which allows to form adequate voids in a catalyst layer" is, for example, a structure in which primary particles are connected to each other in a bead shape (such a structure may also be called "connected structure", hereinafter). Some conventional carbon supports have such a connected structure.

However, no proposals have been made so far for such a catalyst support composed of a conductive metal oxide and satisfying all of the aforesaid conditions.

For example, the catalyst support described in Non-Patent Literature 2 or Patent Literature 1 does not have a connected structure and these literatures do not include a description on a pore diameter. The catalyst support described in Non-Patent Literature 2 has a relatively small specific surface area. The catalyst support described in Non-Patent Literature 3 has a connected structure but has a relatively small specific surface area and this literature does not include a description on a pore diameter. Further, the $SnO_2$ particles described in each of Non-Patent Literature 4 and Patent Literature 2 do not have a connected structure.

CITATION LIST

Patent Literatures

Patent Literature 1: Japanese Unexamined Patent Application Publication No. 2017-183273
Patent Literature 2: Japanese Unexamined Patent Application Publication No. 2010-120800

Non-Patent Literatures

Non-Patent Literature 1: T. Arai et al., SAE Int. J. Alt. Power., 2017, 6, 145
Non-Patent Literature 2: F. Takasaki et al., J. Electrochem. Soc., 2011, 158, B1270
Non-Patent Literature 3: K. Kakinuma et al., ACS Appl. Mater. Interfaces, 2019, 11, 34957
Non-Patent Literature 4: X. Wang et al., Eur. J. Inor. Chem., 2014, 863

SUMMARY OF THE INVENTION

A problem to be solved by the present invention is to provide porous oxide semiconductor particles having a connected structure and a relatively large specific surface area.

Another problem to be solved by the present invention is to provide porous oxide semiconductor particles having a connected structure and a high specific surface area and in addition, having adequate pore diameter, conductivity, average particle diameter of primary particles, pore volume, average crystallite diameter, and/or tap density.

A further problem to be solved by the present invention is to provide porous oxide semiconductor particles suited as a catalyst support for polymer electrolyte fuel cell.

In order to solve the aforesaid problems, the porous oxide semiconductor particles according to the present invention include a connected structure in which porous primary particles having an aggregate of crystallites composed of an oxide semiconductor are connected to each other and have a specific surface area of 60 m$^2$/g or more.

Porous oxide semiconductor particles having mesopores can be obtained by using a carbon porous body having mesopores as a template, precipitating an oxide semiconductor in the mesopores of the template, and removing the template. At this time, by using a carbon porous body having mesopores and a connected structure as a template and optimizing the preparation conditions, porous oxide semiconductor particles having mesopores and a connected structure and having a specific surface area of 60 m$^2$/g or more can be obtained.

Since the porous oxide semiconductor particles thus obtained have a low filling property, a catalyst layer formed using these particles have adequate voids therein. In addition, the porous oxide semiconductor particles have a high specific surface area so that catalyst metal fine particles can be supported on their surface in a highly dispersed form. Further, by supporting the catalyst metal fine particles in the mesopores, the catalyst can be suppressed from being poisoned by a catalyst layer ionomer. Moreover, the oxide semiconductor doped with a different element if necessary may contribute to a controlled conductivity.

Using such a porous oxide semiconductor as a catalyst support for polymer electrolyte fuel cell makes it possible to suppress catalyst metal fine particles from falling due to the oxidation corrosion of the support, accelerate the transfer of a material in the catalyst layer, or suppress deterioration in activity due to the catalyst poisoning.

DETAILED DESCRIPTION OF THE PREFERRED EMBODIMENTS

Figure 1:
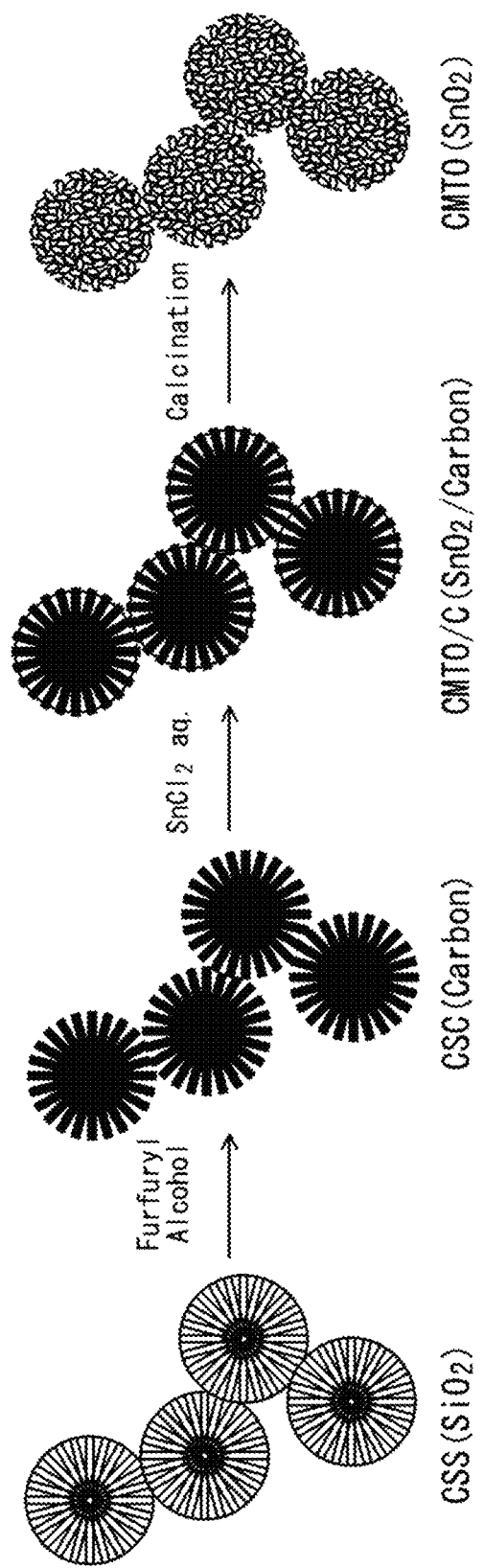
FIG. 1 is a schematic view of a method of manufacturing connected mesoporous $SnO_2$.

An embodiment of the present invention will hereinafter be described in detail.

[1. Porous Oxide Semiconductor Particles]

The porous oxide semiconductor particles according to the present invention include a connected structure in which porous primary particles having an aggregate of crystallites composed of an oxide semiconductor are connected to each other and have a specific surface area of 60 m$^2$/g or more.

[1.1. Primary Particles]

The primary particles have an aggregate of crystallites composed of an oxide semiconductor. In addition, the primary particles are composed of porous particles having mesopores in the spaces between the crystallites.

[1.1.1. Oxide Semiconductor]

In the present invention, the kind of the oxide semiconductor constituting the crystallites is not particularly limited. Examples of the oxide semiconductor include $SnO_2$, $TiO_2$, $SrTiO_3$, $ZrO_2$, $WO_3$, $Bi_2O_3$, $Fe_2O_3$, NiO, CuO, $CeO_2$, ZnO, and $In_2O_3$. The oxide semiconductor may be composed of any one of these materials or may be a mixture or compound composed of two or more of them.

Of these materials, $SnO_2$ is suited as the oxide semiconductor which constitutes the crystallites because it has high endurance under the circumstance of a fuel cell. As the $SnO_2$, a dopant-free or a dopant-containing one may be used. Examples of the dopant include Nb, Sb, W, Ta, and Al. The dopant contained in the $SnO_2$ may be any one or two or more of them.

[1.1.2. Average Particle Diameter of Primary Particles]

The term "average particle diameter of primary particles" means an average value of the maximum size (=diameter) of primary particles.

The average particle diameter of primary particles can be determined by scanning electron microscopic (SEM) observation.

In general, it becomes difficult for primary particles having a too small average particle diameter to support the catalyst particles thereon. Therefore, an average particle diameter of primary particles is preferably 0.05 μm or more. The average particle diameter is more preferably 0.06 μm or more and still more preferably 0.07 μm or more.

On the other hand, when the primary particles have a too large average particle diameter, the catalyst layer becomes thick and has an increased ionic resistance and electronic resistance. Therefore, an average particle diameter of primary particles is preferably 2 μm or less. The average particle diameter is more preferably 1 μm or less and still more preferably 0.5 μm or less.

[1.1.3. Average Crystallite Diameter]

The term "average crystallite diameter" means an average value of maximum size (=diameter) of crystallites.

The average crystallite diameter can be found from the line width of an X-ray diffraction peak and Scherrer's formula.

An excessive decrease in average crystallite diameter leads to an excessive decrease in pore diameter. Therefore, the average crystallite diameter is preferably 2 nm or more. The average crystallite diameter is more preferably 3 nm or more and still more preferably 4 nm or more.

On the other hand, an excessive increase in average crystallite diameter leads to an excessive increase in pore diameter. Therefore, the average crystallite diameter is preferably 40 nm or less. The average crystallite diameter is more preferably 20 nm or less and still more preferably 10 nm or less.

[1.1.4. Shape of Primary Particles]

In the present invention, the shape of the primary particles is not particularly limited. When porous oxide semiconductor particles are prepared using a method described below, the primary particles usually do not have a completely spherical shape but have an irregular shape with an aspect ratio of about 1.1 to 3.

[1.2. Secondary Particles]

Secondary particles have a connected structure.

The term "connected structure" as used herein means a structure in which primary particles are connected to each other in a bead shape. Since in the secondary particles having a connected structure, primary particles are sparsely connected to each other, relatively coarse voids are present between the primary particles. In addition, the primary particles are composed of an aggregate of fine crystallites so that they have therein relatively fine voids (mesopores).

As will be described later, the porous oxide semiconductor particles according to the present invention are manufactured using mesoporous carbon as a template. The mesoporous carbon is manufactured using mesoporous silica as a template. The mesoporous silica is usually synthesized by polycondensing a silica source in a reaction solution containing a silica source, a surfactant, and a catalyst.

During synthesis, by limiting the concentration of the surfactant and the concentration of the silica source in the reaction solution to fall in specific ranges, respectively, mesoporous silica having a connected structure and having an average particle diameter of primary particles, a pore diameter, a pore volume, a tap density, and the like which fall in respective predetermined ranges can be obtained.

By using such mesoporous silica having a connected structure as a first template, mesoporous carbon having a connected structure can be obtained. Further, by using the mesoporous carbon having a connected structure as a second template, porous oxide semiconductor particles having a connected structure can be obtained.

[1.3. Characteristic]

[1.3.1. Specific Surface Area]

When the porous oxide semiconductor particles according to the present invention are used as a catalyst support for PEFC, an excessive decrease in the specific surface area of the porous oxide semiconductor particles makes it impossible to support the active species of a catalyst as fine particles in a highly dispersed form, causing a decrease in the effective area of the catalyst. Therefore, the larger the specific surface area of the porous oxide semiconductor particles, the better.

The porous oxide semiconductor particles according to the present invention include a connected structure and have, in the primary particles thereof, mesopores so that they have a larger specific surface area than a conventional material. By optimizing the manufacturing conditions, the specific surface area of the porous oxide semiconductor particles becomes 60 $m^2/g$ or more. By further optimizing the manufacturing conditions, the specific surface area of the porous oxide semiconductor particles becomes 80 $m^2/g$ or more, 100 $m^2/g$ or more, or 150 $m^2/g$ or more.

Even porous oxide semiconductor particles having a specific surface area of about 200 $m^2/g$ can be synthesized using a method described below.

[1.3.2. Pore Diameter]

The term "pore diameter" means an average diameter of mesopores contained in the primary particles and it does not include the size of voids between the primary particles.

A pore diameter can be obtained by analyzing the adsorption-side data of the nitrogen adsorption isotherm of porous oxide semiconductor particles by the BJH method and finding a pore diameter (most frequent peak value or mode pore diameter) at which the pore volume becomes maximum.

The primary particles are an aggregate of fine crystallites so that they have mesopores therein. When the porous oxide semiconductor particles according to the present invention are used as a catalyst support for PEFC, poisoning by a catalyst layer ionomer can be suppressed by supporting catalyst particles in the mesopores. In general, an excessive decrease in the pore diameter of the primary particles makes it difficult to supply a reaction gas or proton to a catalyst supported in the pores or difficult to discharge water generated by the reaction. Therefore, a pore diameter is preferably 1 nm or more. The pore diameter is more preferably 2 nm or more and still more preferably 3 nm or more.

On the other hand, an excessive increase in pore diameter easily causes invasion of a catalyst layer ionomer into the pores and catalyst poisoning. Therefore, a pore diameter is preferably 20 nm or less. The pore diameter is more preferably 10 nm or less and still more preferably 5 nm or less.

[1.3.3. Pore Volume]

The term "pore volume" means the volume of mesopores contained in the primary particles and it does not include the volume of voids between the primary particles.

The pore volume can be obtained by analyzing the adsorption data of the nitrogen adsorption isotherm of porous oxide semiconductor particles by the BJH method and calculating using values at $P/P_0$=0.03 to 0.99.

When the porous oxide semiconductor particles according to the present invention are used for a catalyst support for PEFC, if the pore volume becomes too small, a proportion of catalyst particles supported in pores decreases. The pore volume is therefore desirably mL/g or more. The pore volume is more desirably 0.15 mL/g or more and still more desirably 0.2 mL/g or more.

On the contrary, if the pore volume becomes too large, the proportion of pore walls composed of the oxide semiconductor becomes smaller, leading to a decrease in electronic conductivity. In addition, due to an increase in an invasion amount of an ionomer, the catalyst may be poisoned and therefore have deteriorated activity. The pore volume is therefore desirably 1 mL/g or less. The pore volume is more desirably 0.7 mL/g or less and still more desirably 0.5 mL/g or less.

[1.3.4. Conductivity of a Green Compact]

The term "conductivity of a green compact" means a value determined by:
(a) forming porous oxide semiconductor particles with two stainless-steel disks and a plastic jig having a cylindrical hole opened therein, and
(b) measuring a voltage of the resulting green compact while applying a constant current thereto under pressure of 2.4 MPa.

The conductivity of the green compact (meaning, porous oxide semiconductor particles) mainly depends on the kind of the oxide semiconductor and the kind and amount of the dopant. By optimizing the composition of the oxide semiconductor, a conductivity of the green compact becomes $1\times10^{-5}$ S/cm or more. By optimizing the manufacturing conditions, the conductivity of the green compact becomes $1\times10^{-4}$ S/cm or more or $1\times10^{-2}$ S/cm or more.

Even porous oxide semiconductor particles having a conductivity of the green compact of about 10 S/cm can be synthesized by the method described later.

[1.3.5. Tap Density]

The term "tap density" means a value measured in accordance with JIS Z 2512.

When the porous oxide semiconductor particles according to the present invention are used for the catalyst layer of PEFC, if the tap density of the porous oxide semiconductor particles becomes too small, the catalyst layer thus obtained has a too large thickness and has deteriorated proton conductivity. The tap density is therefore desirably 0.005 g/cm$^3$ or more. The tap density is more desirably 0.01 g/cm$^3$ or more and still more desirably 0.05 g/cm$^3$ or more.

On the contrary, if the tap density becomes too large, it is difficult to secure, in the catalyst layer formed using the aforesaid particles, voids capable of suppressing flooding. The tap density is therefore desirably 1.0 g/cm$^3$ or less. The tap density is more desirably 0.75 g/cm$^3$ or less.

[1.4. Intended Use]

The porous oxide semiconductor particles according to the present invention can be used as a catalyst support for PEFC, a catalyst support for polymer electrolyte electrolysis cell (PEEC), or the like. The porous oxide semiconductor particles according to the present invention have mesopores, a large specific surface area, and a high conductivity and are resistant to oxidation corrosion so that they are particularly suited as a catalyst support for PEFC.

[2. Method of Manufacturing Mesoporous Silica (First Template)]

For manufacturing the porous oxide semiconductor particles according to the present invention, it is necessary to manufacture mesoporous silica (first template) having a connected structure. Such mesoporous silica can be obtained by:
(a) polycondensing a silica source in a reaction solution containing the silica source, a surfactant, and a catalyst and thereby preparing precursor particles,
(b) separating the precursor particles from the reaction solution and drying the former one,
(c) subjecting the dried precursor particles to diameter expansion treatment if necessary, and
(d) baking the resulting precursor particles.

[2.1. Polycondensation Process]

Firstly, precursor particles are obtained by polycondensing a silica source in a reaction solution containing the silica source, a surfactant, and a catalyst (polycondensation process).

[2.1.1. Silica Source]

In the present invention, the type of a silica source is not particularly limited. Examples of a silica source are:
(a) tetraalkoxysilanes such as tetramethoxysilane, tetraethoxysilane, tetraisopropoxysilane, tetrabutoxysilane, dimethoxydiethoxysilane, and tetraethylene glycoxysilane; and
(b) trialkoxysilanes such as 3-mercaptopropyltrimethoxysilane, 3-aminopropyltrimethoxysilane, 3-aminopropyltriethoxysilane, and 3-(2-aminoethyl)aminopropyltrimethoxysilane. As a silica source, any one of those may be used or two or more of them may be used in combination.

[2.1.2. Surfactant]

In the case of polycondensing a silica source in a reaction solution, when a surfactant is added to the reaction solution, the surfactant forms a micelle in the reaction solution. Since hydrophilic groups are gathered around the micelle, the silica source is adsorbed on the surface of the micelle. Further, the micelle adsorbing the silica source self-organizes in the reaction solution and the silica source is polycondensed. As a result, mesopores due to the micelle are formed in primary particles. The size of the mesopores can be controlled (1 to up to 50 nm) mainly by the molecular length of the surfactant.

In the present invention, alkyl quaternary ammonium salt is used as a surfactant. The alkyl quaternary ammonium salt is a chemical compound represented by the following expression;

$$CH_3-(CH_2)_n-N^+(R_1)(R_2)(R_3)X^- \qquad (a).$$

In the expression (a), $R_1$, $R_2$, and $R_3$ represent alkyl groups each of which has a carbon number of 1 to 3, respectively. $R_1$, $R_2$, and $R_3$ may be the same as or different from each other. In order to facilitate the aggregation of alkyl quaternary ammonium salts (formation of micelle), it is desirable that all of $R_1$, $R_2$, and $R_3$ are the same. Further, it is desirable that at least one of $R_1$, $R_2$, and $R_3$ is a methyl group and more desirable that all of $R_1$, $R_2$, and $R_3$ are a methyl group.

In the expression (a), X represents a halogen atom. Type of the halogen atom is not particularly limited but it is desirable that X is Cl or Br for the reason of availability.

In the expression (a), n represents an integer of 7 to 21. Generally, as n is smaller, a spherical mesoporous material in which the central pore diameter of mesopores is smaller is obtained. On the other hand, as n is larger, the central pore diameter is larger. If n is too large, however, hydrophobic interaction of the alkyl quaternary ammonium salt becomes excessive. As a result, a layered compound is generated and a mesoporous material is not obtained. n is desirably 9 to 17 and more desirably 13 to 17.

Among the substances represented by the expression (a), alkyltrimethylammonium halide is desirable. Examples of alkyltrimethylammonium halide are hexadecyltrimethylammonium halide, octadecyltrimethylammonium halide, nonyltrimethylammonium halide, decyltrimethylammonium halide, undecyltrimethylammonium halide, and dodecyltrimethylammonium halide.

Among them, alkyltrimethylammonium bromide or alkyltrimethylammonium chloride is particularly desirable.

In the case of synthesizing mesoporous silica, one or two or more kinds of alkyl quaternary ammonium salts may be used. However, since an alkyl quaternary ammonium salt becomes a template for forming mesopores in primary particles, the type largely influences the shapes of the mesopores. In order to synthesize silica particles having more uniform mesopores, it is desirable to use one kind of alkyl quaternary ammonium salt.

[2.1.3. Catalyst]

When a silica source is polycondensed, usually a catalyst is added in a reaction solution. In the case of synthesizing particulate mesoporous silica, an alkali such as sodium hydroxide or aqueous ammonia is used preferably as a catalyst.

[2.1.4. Solvent]

As a solvent, water, an organic solvent such as alcohol, a mixed solvent of water and an organic solvent, or the like is used.

As the alcohol, any one of
(1) monohydric alcohol such as methanol, ethanol, and propanol,
(2) divalent alcohol such as ethylene glycol, and
(3) trivalent alcohol such as glycerin
may be acceptable.

In the case of using the mixed solvent of water and an organic solvent, the content of the organic solvent in the mixed solvent can be selected arbitrarily depending on the purpose. In general, addition of an adequate amount of the organic solvent to the solvent facilitates control of a particle diameter or particle diameter distribution.

[2.1.5. Composition of the Reaction Solution]

The composition of the reaction solution has an influence on the external appearance or pore structure of the mesoporous silica thus synthesized. In particular, the concentration of the surfactant and the concentration of the silica source, each in the reaction solution, have a large influence on the average particle diameter of primary particles, the pore diameter, the pore volume, and the tap density of the mesoporous silica particles.

[A. Concentration of the Surfactant]

When the concentration of the surfactant is too low, the precipitation rate of the particles decreases and a structure in which primary particles are connected to each other cannot be obtained. The concentration of the surfactant is therefore required to be 0.03 mol/L or more. The concentration of the surfactant is desirably 0.035 mol/L or more and more desirably 0.04 mol/L or more.

On the contrary, when the concentration of the surfactant is too high, the precipitation rate of the particles excessively increases and the primary particle diameter easily exceeds 300 nm. The concentration of the surfactant is therefore required to be 1.0 mol/L or less. The concentration of the surfactant is desirably 0.95 mol/L or less and more desirably 0.90 mol/L or less.

[B. Concentration of the Silica Source]

When the concentration of the silica source is too low, the precipitation rate of the particles decreases and a structure in which primary particles are connected to each other cannot be obtained, or the content of the surfactant becomes excessively large and uniform mesopores cannot always be obtained. The concentration of the silica source is therefore required to be 0.05 mol/L or more. The concentration of the silica source is desirably 0.06 mol/L or more and more desirably 0.07 mol/L or more.

On the contrary, when the concentration of the silica source is too high, the precipitation rate of the particles excessively increases and the primary particle diameter easily exceeds 300 nm, or not spherical particles but sheet-like particles are sometimes obtained. The concentration of the silica source is therefore required to be 1.0 mol/L or less. The concentration of the silica source is desirably 0.95 mol/L or less and more desirably 0.9 mol/L or less.

[C. Concentration of Catalyst]

In the present invention, a concentration of a catalyst is not particularly limited. Generally, if a concentration of a catalyst is too low, the precipitation rate of particles becomes low. On the other hand, if a concentration of a catalyst is too high, the precipitation rate of particles becomes high. It is desirable to select an optimum concentration of a catalyst in accordance with the type of a silica source, the type of a surfactant, a targeted physical property value, and others.

[2.1.6. Reaction Conditions]

Hydrolysis and polycondensation are performed by adding a silica source in a solvent containing a predetermined amount of surfactant. Consequently, the surfactant functions as a template and precursor particles containing silica and the surfactant are obtained.

With regard to reaction conditions, optimum conditions are selected in accordance with the type of a silica source, the particle diameters of the precursor particles, and others. Generally, a desirable reaction temperature is $-20°$ C. to $100°$ C. A reaction temperature is more desirably $0°$ C. to $90°$ C., and still more desirably $10°$ C. to $80°$ C.

[2.2. Drying Process]

Successively, the precursor particles are separated from the reaction solution and dried (drying process).

The drying is applied in order to remove the solvent remaining in the precursor particles. The drying condition is not particularly limited as long as the solvent can be removed.

[2.3. Diameter Expansion Treatment]

Successively, diameter expansion treatment may be applied to the dried precursor particles if necessary (diameter expansion process). The "diameter expansion treatment" means a treatment of expanding the diameters of mesopores in primary particles.

Specifically, the diameter expansion treatment is applied by hydrothermally heat-treating the synthesized precursor particles (particles from which the surfactant is not removed) in a solution containing a diameter expander. By this treatment, it is possible to expand the pore diameters of the precursor particles.

Examples of a diameter expander are:
(a) hydrocarbons such as trimethylbenzene, triethylbenzene, benzene, cyclohexane, triisopropylbenzene, naphthalene, hexane, heptane, octane, nonane, decane, undecane, and dodecane; and
(b) acids such as hydrochloric acid, sulfuric acid, and nitric acid.

Pore diameters are expanded by hydrothermal treatment under the coexistence of hydrocarbon. This is probably because silica rearrangement occurs when a diameter expander is introduced from a solvent into pores of more hydrophobic precursor particles.

Further, pore diameters are expanded by hydrothermal treatment under the coexistence of acid such as hydrochloric acid. This is probably because dissolution/reprecipitation of silica progresses in the interiors of primary particles. When manufacturing conditions are optimized, radial pores are formed in the interior of silica. When hydrothermal treatment is applied to it under the coexistence of acid, dissolution/reprecipitation of silica occurs and the radial pores are converted to communicating pores.

The conditions of the diameter expansion treatment are not particularly limited as long as target pore diameters can be obtained. Usually, it is desirable to add a diameter expander of about 0.05 mol/L to 10 mol/L to a reaction solution and apply hydrothermal treatment at $60°$ C. to $150°$ C.

[2.4. Baking Process]

Successively, after the diameter expansion treatment is performed if necessary, the precursor particles are baked (baking process). By this process, mesoporous silica particles having a connected structure are obtained.

The baking is performed to dehydrate/crystallize the precursor particles having a residual OH group and to thermally decompose the surfactant remaining in the mesopores. The baking conditions are not particularly limited as long as the dehydration/crystallization and thermal decomposition of the surfactant can be performed. Usually, the baking is performed by heating the precursor particles at 400° C. to 700° C. for 1 to 10 hours in the atmosphere.

[3. Method of Manufacturing Mesoporous Carbon (Second Template)]

Successively, mesoporous carbon (second template) having a connected structure is manufactured using the mesoporous silica having a connected structure as a template. Such mesoporous carbon can be obtained by:

(a) preparing mesoporous silica acting as a first template,
(b) precipitating carbon in the mesopores of the mesoporous silica to prepare a silica/carbon complex, and
(c) removing silica from the complex.

In order to accelerate graphitization of the resulting mesoporous carbon, the mesoporous carbon may be heat treated at a temperature higher than 1500° C. after removal of silica.

[3.1. First Template Preparation Process]

First, mesoporous silica which will serve as a first template is prepared (first template preparation process). The details of the method of manufacturing mesoporous silica have already been described above so that a description on them is omitted.

[3.2. Carbon Precipitation Process]

Successively, carbon is precipitated in the mesopores of the mesoporous silica to prepare a silica/carbon complex (carbon precipitation process).

Described specifically, the precipitation of carbon in the mesopores is performed by:

(a) introducing a carbon precursor into mesopores; and
(b) polymerizing and carbonizing the carbon precursor in the mesopores.

[3.2.1. Introduction of Carbon Precursor]

A "carbon precursor" means a substance that can produce carbon by thermal decomposition. Concrete examples of such a carbon precursor are:

(1) a thermopolymerizable polymer precursor that is a liquid at room temperature (for example, furfuryl alcohol, aniline, etc.);
(2) a mixture of an aqueous solution of carbohydrate and acid (for example, a mixture of a monosaccharide such as sucrose, xylose, or glucose, a disaccharide, or a polysaccharide and acid such as sulfuric acid, hydrochloric acid, nitric acid, or phosphoric acid); and
(3) a mixture of two-component curable polymer precursors (for example, phenol and formalin).

Among those, a polymer precursor can be impregnated into mesopores without being diluted with a solvent and hence can generate a relatively large amount of carbon in mesopores with a relatively small number of impregnations. Further, it has the advantages of not requiring a polymerization initiator and being easy to handle.

When a carbon precursor of a liquid or a solution is used, the larger the amount of the liquid or the solution adsorbed at one time, the better, and an amount that allows the entire mesopores to be filled with the liquid or the solution is preferable.

Further, when a mixture of an aqueous solution of a carbohydrate and acid is used as a carbon precursor, it is preferable that the amount of the acid is a minimum amount that can polymerize an organic matter.

Furthermore, when a mixture of two-component curable polymer precursors is used as a carbon precursor, an optimum ratio is selected in accordance with the types of the polymer precursors.

[3.2.2. Polymerization and Carbonization of Carbon Precursor]

Successively, the polymerized carbon precursor is carbonized in the mesopores.

The carbonization of the carbon precursor is performed by heating mesoporous silica containing the carbon precursor to a predetermined temperature in a non-oxidizing atmosphere (for example, in an inert atmosphere or in vacuum). A desirable heating temperature is concretely 500° C. or higher to 1,200° C. or lower. If the heating temperature is lower than 500° C., the carbonization of the carbon precursor becomes insufficient. On the other hand, if the heating temperature exceeds 1,200° C., silica reacts with carbon undesirably. As the heating time, an optimum time is selected in accordance with the heating temperature.

Here, the amount of carbon generated in mesopores may be any amount as long as the amount is not less than an amount of allowing carbon particles to maintain their shapes when mesoporous silica is removed. When the amount of carbon generated through a single filling, polymerization, and carbonization is relatively small therefore, it is desirable to repeat those processes multiple times. On this occasion, the conditions of repeated processes may be the same or different.

Further, when the processes of filling, polymerization, and carbonization are repeated multiple times, in the carbonization process, it is also possible to apply carbonization treatment at a relatively low temperature and, after the last carbonization treatment is finished, apply carbonization treatment again at a temperature higher than the previous temperature. When the last carbonization treatment is applied at a temperature higher than the temperature of the previous carbonization process, it becomes easier to integrate the carbon introduced into the pores in multiple times.

[3.3. First Template Removal Process]

Successively, the mesoporous silica serving as the first template is removed from the complex (first template removal process). By this removal, mesoporous carbon (second template) having a connected structure is obtained.

Concrete examples of a method of removing mesoporous silica include:

(1) a method of heating the complex in an aqueous solution of an alkali such as sodium hydroxide, and
(2) a method of etching the complex in an aqueous solution of hydrofluoric acid.

[3.4. Graphitization Treatment Process]

Successively, mesoporous carbon is heat treated at a temperature higher than 1500° C. if necessary (graphitization process). In the case of carbonizing a carbon source in the mesopores of the mesoporous silica, the heat treatment temperature should inevitably be decreased to suppress a reaction between silica and carbon. The graphitization degree of carbon after carbonization treatment is low. In order to achieve a high graphitization degree, the mesoporous carbon is therefore desirably heat treated at a high temperature after removal of the first template.

Heat treatment at a too low temperature leads to insufficient graphitization. The heat treatment temperature is desirably more than 1500° C. The heat treatment temperature is desirably 1700° C. or higher. The heat treatment temperature is more desirably 1800° C. or higher.

On the other hand, an increase in the heat treatment temperature to more than necessary is not useful because of no difference in effect. The heat treatment temperature is therefore desirably 2300° C. or lower. The heat treatment temperature is more desirably 2200° C. or lower.

[4. Method of Manufacturing Porous Oxide Semiconductor Particles]

The method of manufacturing the porous oxide semiconductor particles according to the present invention includes:
a first process of preparing mesoporous carbon having a connected structure,
a second process of precipitating an oxide semiconductor in the mesopores of mesoporous carbon to obtain an oxide/carbon complex, and
a third process of removing the carbon from the oxide/carbon complex.

[4.1. First Process]

First, mesoporous carbon having a connected structure is prepared (first process). Details of the method of manufacturing mesoporous carbon has already been described above so that a description on it is omitted.

[4.2. Second Process]

Successively, an oxide semiconductor is precipitated in the mesopores of the mesoporous carbon (second process), by which an oxide/carbon complex is obtained.

Described specifically, the precipitation of the oxide semiconductor in the mesopores is performed by introducing a precursor of the oxide semiconductor in the mesopores and converting the precursor into the corresponding oxide semiconductor.

[4.2.1. Precursor]

Specific examples of the precursor for forming the oxide semiconductor in the mesopores include:
(1) compounds which contain a metal element constituting the oxide semiconductor, are soluble in a solvent, and can be oxidized by dissolved oxygen in the solvent to cause precipitation, and
(2) compounds which contain a metal element constituting the oxide semiconductor and can be thermally decomposed or hydrolyzed into a metal oxide.

Examples of the compounds which can be oxidized by dissolved oxygen to cause precipitation include:
(1) divalent Sn-containing salts such as $SnCl_2$,
(2) trivalent Ti-containing salts such as $TiCl_3$,
(3) divalent Fe-containing salts such as $FeSO_4$, and
(4) trivalent Ce-containing salts such as $Ce(CH_3COO)_3$.

Examples of the compounds which can be thermally decomposed or hydrolyzed into a metal oxide include:
(1) sulfates such as $CuSO_4$ and $FeSO_4$,
(2) carboxylates such as $Ni(CH_3COO)_2$, $Cu(CH_3COO)_2$, and iron stearate,
(3) chlorides such as $SnCl_4$, $SnCl_2$, $FeCl_2$, $FeCl_3$, $NiCl_2$, $TiCl_4$, $ZnCl_2$, and $InCl_3$,
(4) alkoxides such as tungsten ethoxide ($W(OC_2H_5)_6$), titanium isopropoxide ($Ti(Oi-C_3H_7)_4$), titanium ethoxide ($Ti(OC_2H_5)_4$), titanium butoxide ($Ti(OC_4H_9)_4$), titanium strontium ethoxide ($Ti(OC_2H_5)_2$—OSrO), zirconium isopropoxide ($Zr(Oi-C_3H_7)_4$), and zirconium ethoxide ($Zr(OC_2H_5)_4$),
(5) nitrates such as $Cu(NO_3)_2$ and $Fe(NO_3)_2$, and
(6) acetylacetonates such as nickel acetylacetonate (Ni$(CH_3COCHCOCH_3)_2$) and tin acetylacetonate (Sn$(CH_3COCHCOCH_3)_2$).

For the preparation of a dopant-containing oxide semiconductor, a dopant-containing precursor is used in addition to a precursor for the formation of the oxide semiconductor. As for the dopant-containing precursor, various salts (sulfates, carboxylates, chlorides, nitrates, or acetylacetonates) or alkoxides may be used, similar to the precursor for the formation of the oxide semiconductor.

[4.2.2. Introduction of the Precursor into Mesopores]

When the precursor is in liquid form, it may be adsorbed in the pores of the mesoporous carbon as it is. Alternatively, a solution obtained by dissolving the precursor in an appropriate solvent may be adsorbed in the pores of the mesoporous carbon. When the precursor is dissolved in a solvent, the kind of the solvent and the concentration of the precursor are not particularly limited but most suited ones may be selected depending on the purpose.

[4.2.3. Conversion of the Precursor into an Oxide]

After adsorption, the resulting precursor is converted into an oxide. A conversion method is not particularly limited and the most suited method is selected, depending on the kind of the precursor.

For example, when the chloride is used as the precursor, mesoporous carbon is dispersed in a solution having the chloride dissolved therein, followed by stirring in the air. By continuing stirring, the chloride is then adsorbed in the mesopores of the mesoporous carbon and the chloride in the mesopores gradually becomes an oxide by dissolved oxygen.

For example, when the alkoxide is used as the precursor, the alkoxide or a solution having it dissolved therein is added to the mesoporous carbon to impregnate the mesopores with the alkoxide or the solution thereof. Heating of the resulting mixture to a predetermined temperature causes polycondensation of the alkoxide and then an oxide is formed in the mesopores.

Adsorption of the precursor and conversion into the oxide may be repeated multiple times if a single adsorption and conversion cannot form a sufficient amount of the oxide semiconductor in the mesopores.

[4.3. Third Process]

Successively, carbon is removed from the oxide/carbon complex (third process), by which the porous oxide semiconductor particles according to the present invention can be obtained.

A method of removing carbon is not particularly limited and various methods can be used therefor. Examples of the method of removing carbon include:
(1) a method of heating the oxide/carbon complex in an oxidizing atmosphere, and
(2) a method of subjecting the complex to oxygen plasma etching.

Removal conditions such as heating temperature and heating time are not particularly limited as long as they can completely remove the carbon without coarsening the crystallites of the oxide semiconductor.

[5. Effect]

Porous oxide semiconductor particles having mesopores can be obtained by using a carbon porous body having mesopores as a template, precipitating an oxide semiconductor in the mesopores of the template, and removing the template. At this time, by using a carbon porous body having mesopores and a connected structure as a template and optimizing the preparation conditions, porous oxide semiconductor particles having mesopores and a connected structure and having a specific surface area of 60 $m^2/g$ or more can be obtained.

Since the porous oxide semiconductor particles thus obtained have a low filling property, a catalyst layer formed using these particles have adequate voids therein. In addition, the porous oxide semiconductor particles have a high specific surface area so that catalyst metal fine particles can be supported on their surface in a highly dispersed form. Further, by supporting the catalyst metal fine particles in the mesopores, the catalyst can be suppressed from being poisoned by a catalyst layer ionomer. Moreover, the oxide semiconductor doped with a different element if necessary may contribute to a controlled conductivity.

Using such a porous oxide semiconductor as a catalyst support for a polymer electrolyte fuel cell makes it possible to suppress catalyst metal fine particles from falling due to the oxidation corrosion of the support, accelerate the transfer of a material in the catalyst layer, or suppress deterioration in activity due to the catalyst poisoning.

EXAMPLES

Examples 1 and 2, and Comparative Example 1

[1. Preparation of Sample]

1.1. Example 1: Connected Mesoporous $SnO_2$

FIG. 1 illustrates a schematic view of a method of manufacturing connected mesoporous $SnO_2$. According to the procedure shown in FIG. 1, connected mesoporous $SnO_2$ was prepared.

[1.1.1. Preparation of Connected Starburst Silica (Radial Pore)]

To a mixed solvent of 4.6 g of methanol (MeOH) and 4.6 g of ethylene glycol (EG), was added 56.3 g of a 30 mass % aqueous cetyltrimethylammonium chloride solution and the resulting mixture was stirred at room temperature. To the resulting mixture was added 8.8 g of 1M NaOH, followed by heating to 50° C. The solution thus obtained will hereinafter be called "first solution".

Successively, 12.3 g of tetraethoxysilane (TEOS) was dissolved in a mixed solvent of 6.5 g of MeOH and 6.5 g of EG. The resulting solution will hereinafter be called "second solution".

The second solution was added to the first solution heated to 50° C. After the resulting mixture became turbid, heating was stopped and stirring was conducted for further 4 hours or more. After filtration and redispersion in purified water were repeated twice, the reaction mixture was dried at 45° C. Further, the dried powder thus obtained was baked at 550° C. for 6 hours in the atmosphere to obtain mesoporous silica in which primary particles having radial pores were connected to each other in a bead shape (such mesoporous silica may also be called "Connected Starburst Silica (CSS) ", hereinafter).

[1.1.2. Preparation of Connected Starburst Carbon (Radial Pores)]

0.5 g of CSS was weighed in a container made of PFA. Furfuryl alcohol (FA) was then added to the container in an amount corresponding to the pore volume of CSS to allow it to penetrate in the pores of CSS. The product thus obtained was heat treated at 150° C. for 24 hours to polymerize FA. Further, the product thus obtained was heat-treatment at 500° C. for 6 hours in a nitrogen atmosphere to promote carbonization of FA. After the aforesaid operation was repeated twice, the product thus obtained was heat treated further at 900° C. for 6 hours in a nitrogen atmosphere to obtain a CSS/carbon complex.

The complex thus obtained was immersed in a 12% HF solution for 4 hours to dissolve the silica component in the solution. After dissolution, filtration and washing were repeated and then drying was performed at 45° C. to obtain mesoporous carbon in which primary particles having radial pores were connected to each other in a bead shape (such mesoporous carbon may also be called "Connected Starburst Carbon (CSC)", hereinafter). The porous body thus obtained had a BET specific surface area of 2122 $m^2/g$, a pore volume of 1.3 mL/g, and a pore diameter of 2.2 nm.

[1.1.2. Preparation of Connected Mesoporous Silica (Random Pores)]

To a mixed solvent of 5.7 g of MeOH and 5.7 g of EG was added 56.3 g of a 30 mass % aqueous solution of cetyltrimethylammonium chloride. The resulting mixture was stirred at room temperature. To the resulting mixture was added 6.5 g of 1M NaOH, followed by heating to 50° C. The solution thus obtained will hereinafter be called "first solution".

Successively, 12.3 g of TEOS was dissolved in a mixed solvent of 6.5 g of MeOH and 6.5 g of EG. The resulting solution will hereinafter be called "second solution".

The second solution was added to the first solution heated to 50° C. After the resulting mixture became turbid, heating was stopped and stirring was conducted for further 4 hours or more. After filtration and redispersion in purified water were repeated twice, the reaction mixture was dried at 45° C. to obtain a white powder.

Successively, 6 g of white powder was ultrasonically dispersed in 120 mL of 0.5M $H_2SO_4$, followed by stirring. The resulting dispersion was placed in an autoclave and subjected to hydrothermal treatment at 130° C. for 72 hours. After the filtration and redispersion in ethanol (EtOH) of the product were repeated twice, the product was dried at 45° C. The dried powder thus obtained was baked in the atmosphere at 550° C. for 6 hours to obtain mesoporous silica in which primary particles having random pores were connected to each other in a bead shape (such mesoporous silica may also be called "Connected Mesoporous Silica (CMS)", hereinafter).

[1.1.4. Preparation of Connected Mesoporous Carbon (Random Pores)]

0.5 g of CMS was weighed in a container made of PFA. FA was then added in an amount corresponding to the pore volume of CMS to allow it to penetrate in the pores of CMS. The product thus obtained was heat treated at 150° C. for 24 hours to polymerize FA. Further, the product thus obtained was heat treated at 500° C. for 6 hours in a nitrogen atmosphere to promote carbonization of FA. After the aforesaid operation was repeated twice, the product thus obtained was heat treated further at 900° C. for 6 hours in a nitrogen atmosphere to obtain a CMS/carbon complex.

The complex thus obtained was immersed in a 12% HF solution for 4 hours to dissolve the silica component in the solution. After dissolution, filtration and washing were repeated and then drying was performed at 45° C. to obtain mesoporous carbon in which primary particles having random pores were connected to each other in a bead shape (such mesoporous carbon may also be called "Connected Mesoporous Carbon (CMC)", hereinafter). The porous body thus obtained had a BET specific surface area of 1740 $m^2/g$, a pore volume of 1.5 mL/g, and a pore diameter of 2.9 nm.

[1.1.5. Preparation of Connected Mesoporous $SnO_2$]

In a 500-mL beaker, a mixed solution containing 250 mL of purified water, 4 mL of concentrated hydrochloric acid (35 mass %), and 5.0 g of $SnCl_2$ was poured. In the mixed solution, 0.1 g of template carbon (CSC or CMC) was dispersed and the resulting dispersion was stirred for 4 hours in the air. Subsequently, filtration and redispersion in purified water were repeated twice, followed by drying at 45° C. to obtain a connected $SnO_2$/carbon complex. The resulting complex was treated at 280° C., 300° C., 320° C., or 350° C. in the air atmosphere for 24 hours to obtain Connected Mesoporous Tin Oxide ($SnO_2$) (CMTO).

1.2. Example 2: Connected Mesoporous Nb—$SnO_2$

[1.2.1. Preparation of Connected Starburst Carbon (Radial Pores)]

In a manner similar to that of Example 1, Connected Starburst Carbon (radial pores, CSC) was prepared.

[1.2.2. Preparation of Connected Mesoporous Nb—$SnO_2$]

In a 500-mL beaker, a mixed solution containing 250 mL of purified water, 4 mL of concentrated hydrochloric acid (35 mass %), 5.0 g of $SnCl_2$, and 0.074 g of $NbCl_2$ was poured. In the mixed solution, 0.1 g of CSC was dispersed and the resulting dispersion was stirred for 4 hours in the air. Subsequently, filtration and redispersion in purified water were repeated twice, followed by drying at 45° C. to obtain a connected Nb—$SnO_2$/carbon complex. The resulting complex was treated at 300° C. for 24 hours in the air atmosphere. Finally, the resulting complex was treated at 500° C., 600° C., or 700° C. for one hour in the Ar atmosphere to obtain Connected Mesoporous Nb-doped Tin Oxide (Nb—$SnO_2$) (CMNbTO).

1.3. Comparative Example 1

Commercially available $SnO_2$ particles (product of FUJIFILM Wako Chemicals) were used for a test as they were.

[2. Test Method]
[2.1. SEM Observation]

SEM observation of the particles thus obtained was performed.

[2.2. $N_2$ Adsorption Measurement]

The nitrogen adsorption isotherm of the particles thus obtained was measured. The pore diameter, pore volume, and BET specific surface area of the particles were calculated from the nitrogen adsorption isotherm.

[2.3. Conductivity]

A green compact of a sample powder was prepared. The conductivity of the green compact was obtained by measuring the voltage at the time when a predetermined electric current was applied to the green compact under a pressure of 2.4 MPa.

[2.4. Tap Density]

The tap density of the particles thus obtained was measured in accordance with JIS Z 2512.

[3. Results]
[3.1. SEM Observation]

Figure 2:
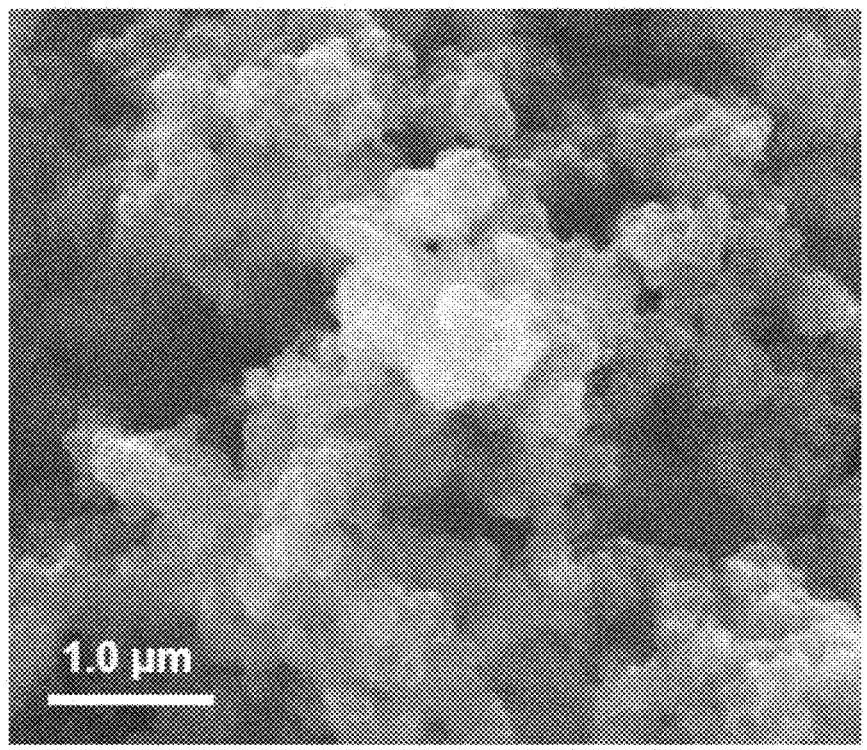
FIG. 2 is an SEM image of connected starburst carbon (CSC).
Figure 3:
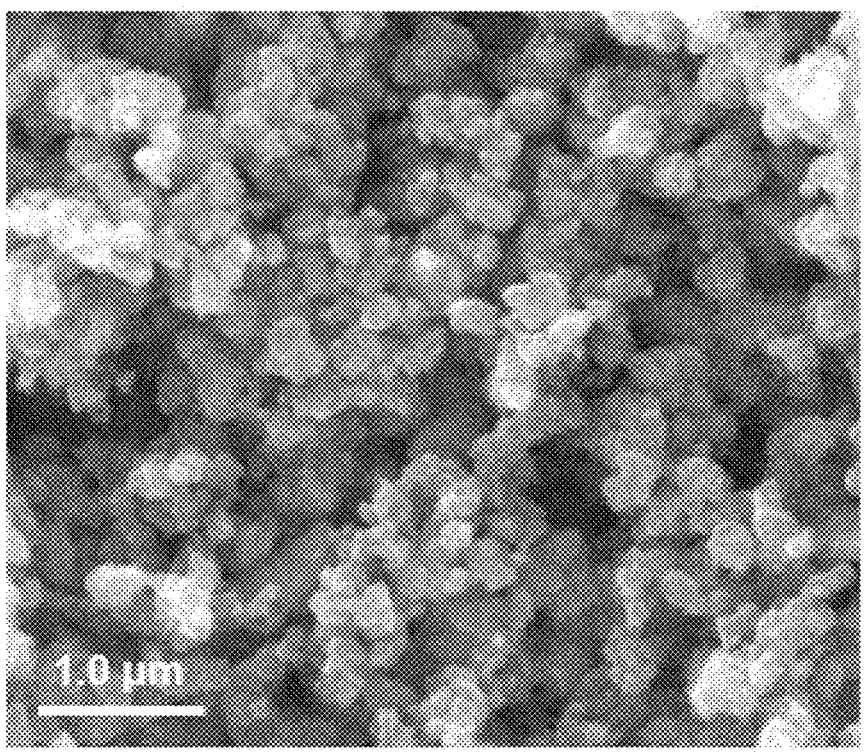
FIG. 3 is an SEM image of connected mesoporous $SnO_2$ (CMTO).

FIG. 2 shows the SEM image (secondary electron image) of the connected starburst carbon (CSC). FIG. 3 shows the SEM image (secondary electron image) of the connected mesoporous $SnO_2$ (CMTO). It is apparent from FIGS. 2 and 3 that CSC and CMTO each have a structure in which primary particles having a diameter of about 100 nm are connected to each other.

[3.2. $N_2$ Adsorption Measurement]
[3.2.1. Pore Diameter Distribution and Mode Pore Diameter of CMTO]

Figure 4:
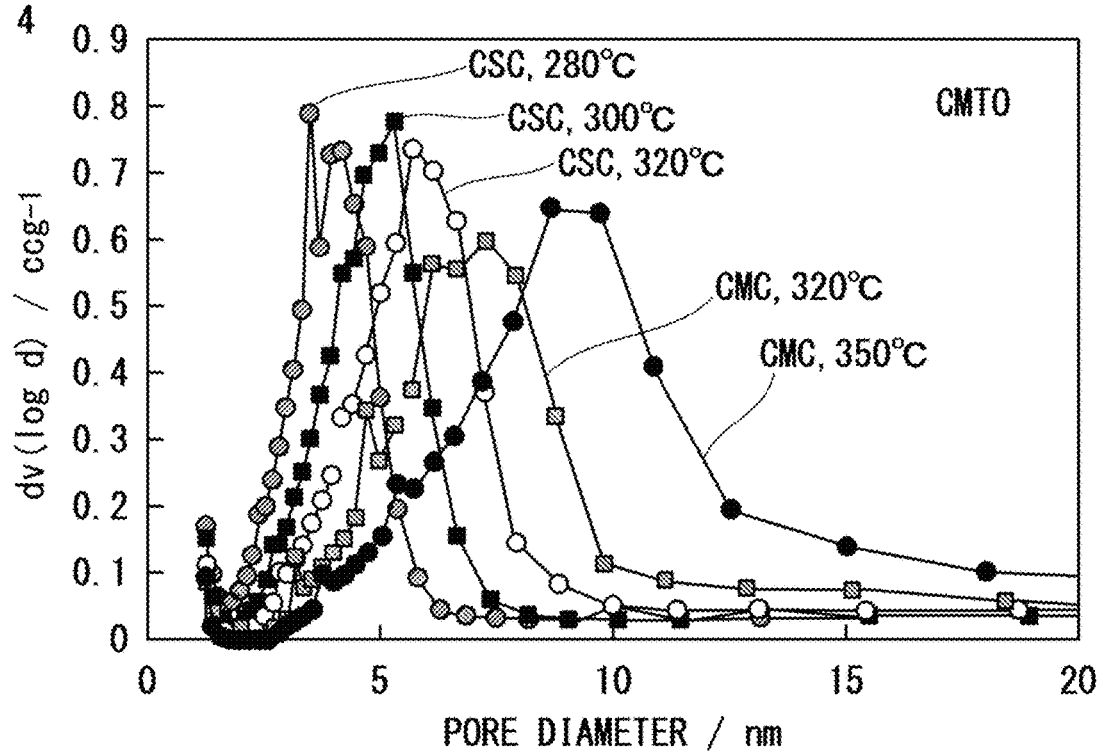
FIG. 4 is a pore diameter distribution of connected mesoporous $SnO_2$ (CMTO).
Figure 5:
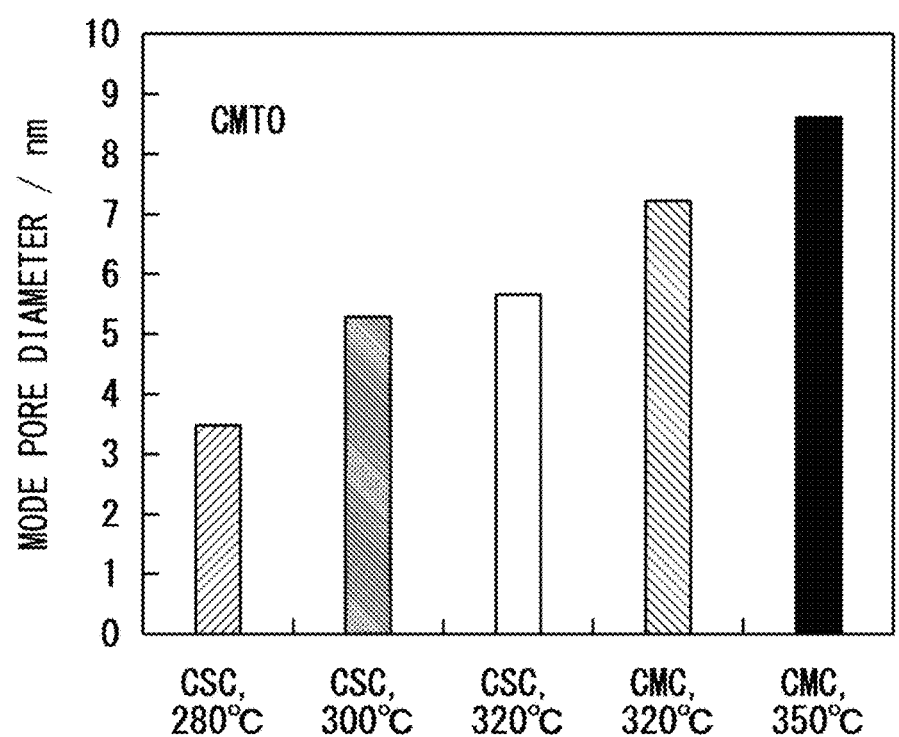
FIG. 5 is a mode pore diameter of connected mesoporous $SnO_2$ (CMTO).

FIG. 4 shows the pore diameter distribution of connected mesoporous $SnO_2$ (CMTO). FIG. 5 shows the mode pore diameter of connected mesoporous $SnO_2$ (CMTO). In FIGS. 4 and 5, the terms "CSC" and "CMC" represent the kind of a template carbon used for the preparation of CMTO and the term "280° C." or the like represents the firing temperature (template carbon removing temperature) of the connected $SnO_2$/carbon complex.

It is apparent from FIGS. 4 and 5 that the pore diameter changes within a range of 3.5 to 8.7 nm, depending on the kind (CSC or CMC) of the template carbon and the firing temperature (280 to 350° C.). The pore diameter was smaller when CSC was used as the template carbon than when CMC was used. In addition, the lower the firing temperature, the smaller the pore diameter. At a too low firing temperature, however, the template carbon was not removed completely.

[3.2.2. Pore Diameter Distribution and Mode Pore Diameter of CMNbTO]

Figure 6:
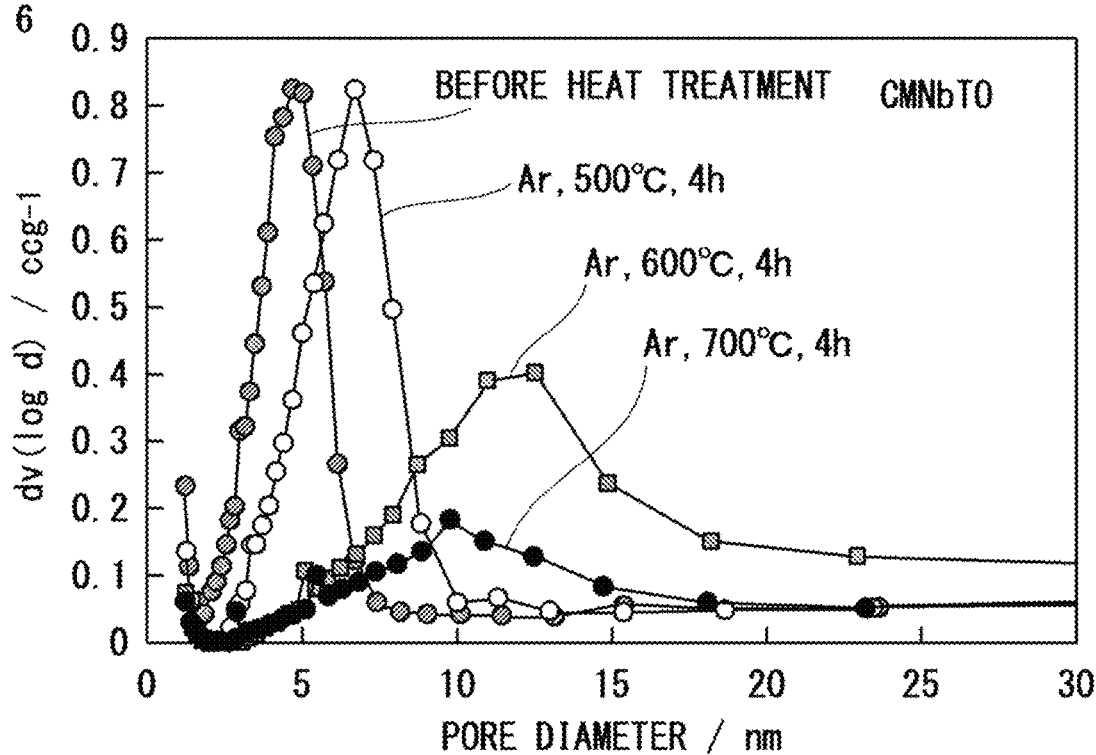
FIG. 6 is a pore diameter distribution of connected mesoporous Nb—$SnO_2$ (CMNbTO).
Figure 7:
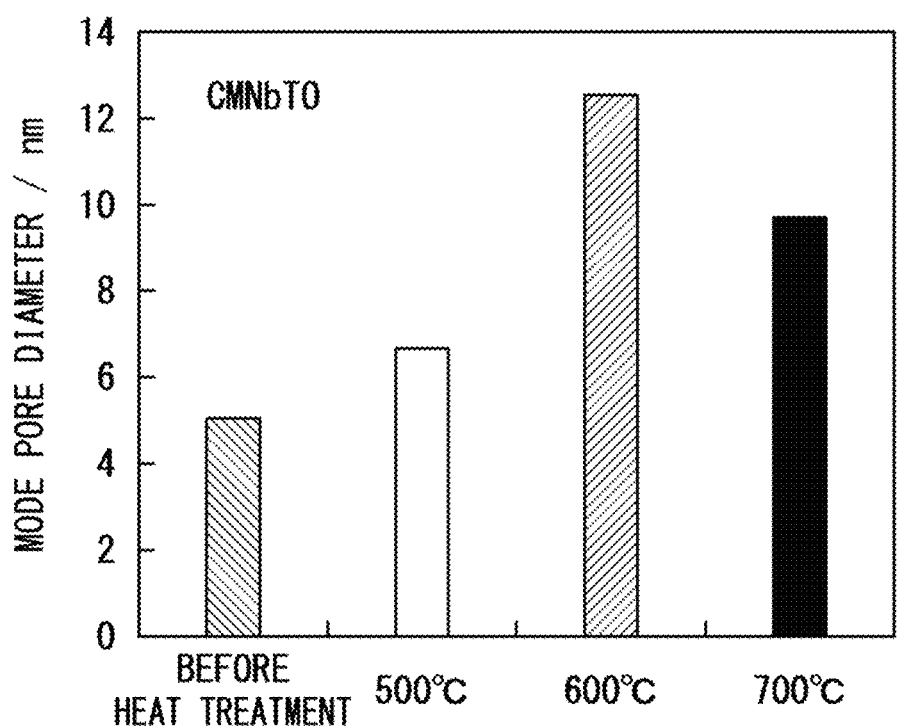
FIG. 7 is a mode pore diameter of connected mesoporous Nb—$SnO_2$ (CMNbTO).

FIG. 6 shows the pore diameter distribution of connected mesoporous Nb—$SnO_2$ (CMNbTO). FIG. 7 shows the mode pore diameter of connected mesoporous Nb—$SnO_2$ (CMNbTO). The term "500° C." or the like in FIGS. 6 and 7 means the heat treatment temperature after removal of the template carbon.

The pore diameter before the heat treatment in the Ar atmosphere was 5.0 nm, while the pore diameter was increased to 6.7 nm, 12.6 nm, and 9.8 nm after heat treatment at 500° C., 600° C., and 700° C., respectively. The pore volume after heat treatment at 700° C. showed a marked decrease, suggesting a decrease in the number of mesopores themselves.

[3.2.3. Specific Surface Area]

Figure 8:
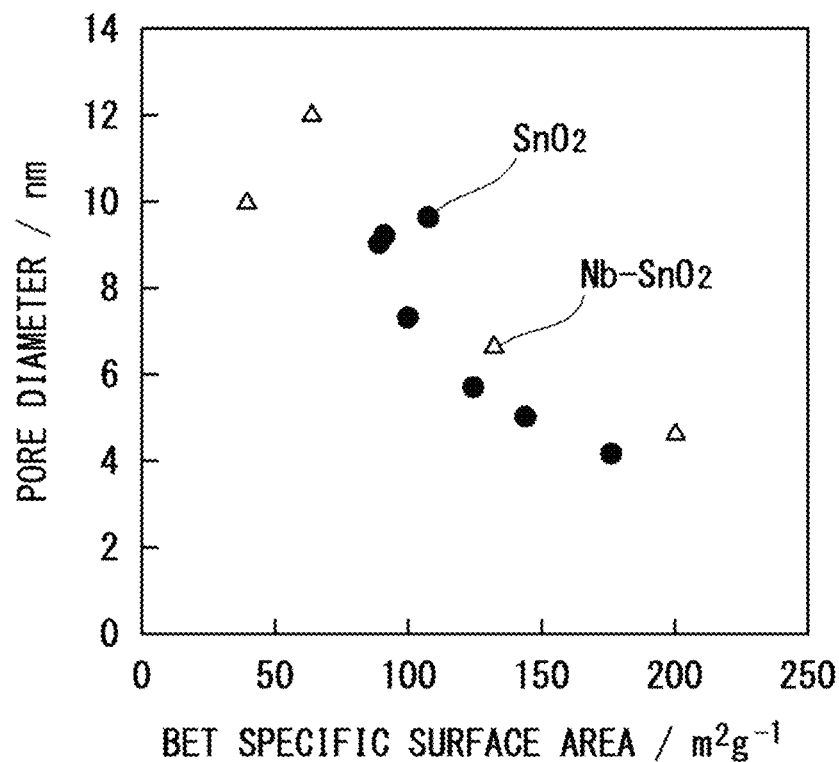
FIG. 8 is a graph showing the relation between BET specific surface area and pore diameter of connected mesoporous $SnO_2$ (CMTO) and connected mesoporous Nb—$SnO_2$ (CMNbTO).

FIG. 8 shows the relation between BET specific surface area and pore diameter of the connected mesoporous $SnO_2$ (CMTO) and the connected mesoporous Nb—$SnO_2$ (CMNbTO).

A decreasing tendency of the pore diameter was found with an increase in the BET specific surface area. There was no remarkable difference found in the aforesaid tendency between $SnO_2$ and Nb—$SnO_2$. The $SnO_2$ fired at 280° C. by using CSC as a template showed the largest BET specific surface area and it was 176 $m^2/g$. On the other hand, the Nb—$SnO_2$ had a BET specific surface area of 200 $m^2/g$ before heat treatment in the Ar atmosphere but a BET specific surface area of 132 $m^2/g$ after heat treatment at 500° C.

[3.3. Conductivity]

Figure 9:
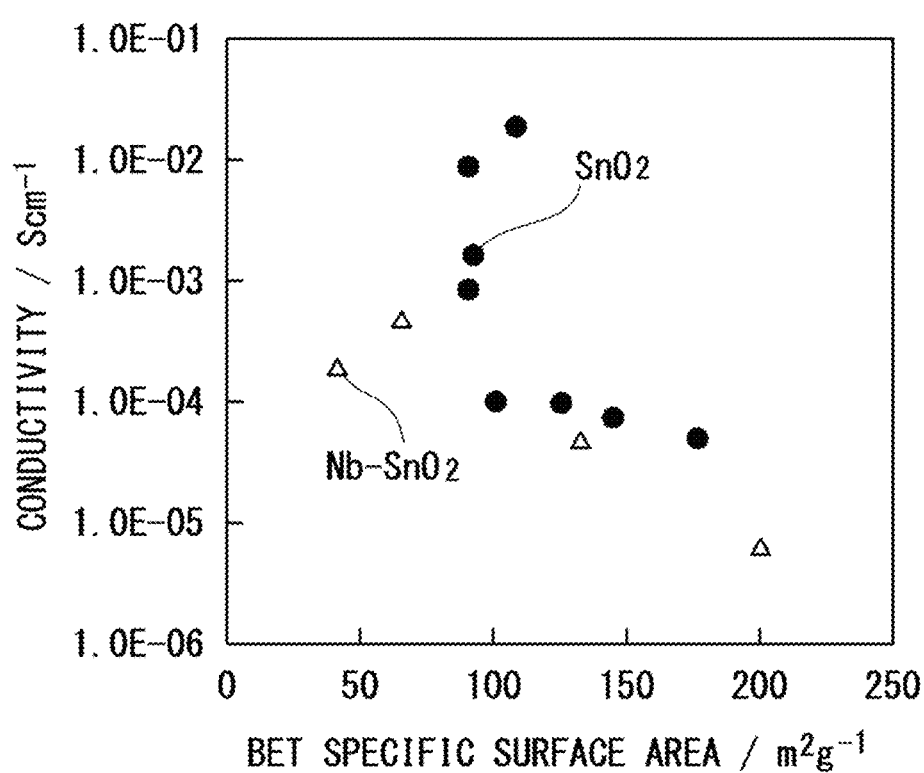
FIG. 9 is a graph showing the relation between BET specific surface area and conductivity of connected mesoporous $SnO_2$ (CMTO) and connected mesoporous Nb—$SnO_2$ (CMNbTO).

FIG. 9 shows the relation between BET specific surface area and conductivity of the connected mesoporous $SnO_2$ (CMTO) and the connected mesoporous Nb—$SnO_2$ (CMNbTO).

With respect to the conductivity, the conductivity showed a decreasing tendency with an increase in the BET specific surface area. The highest conductivity of $SnO_2$ was $1.9 \times 10^{-2}$ S/cm and the lowest one was $5.0 \times 10^{-5}$ S/cm. On the other hand, the conductivity of Nb—$SnO_2$ was as low as $6.2 \times 10^{-6}$ S/cm before heat treatment in the Ar atmosphere, while the conductivity increased to $4.8 \times 10^{-5}$ S/cm or more after heat treatment. The conductivity of the green compacts was equal to or more of the values reported in Non-Patent Literature 3.

[3.4. Tap Density]

Table 1 shows the tap density of the CMTO (Example 1) and the commercially available $SnO_2$ particles (Comparative Example 1). The CMTO in Table 1 is obtained by using CSC as a template and firing at 300° C. Table 1 also shows the BET specific surface area and pore volume of them. The tap density of CMTO was one-third of that of the commercially available $SnO_2$ particles.

TABLE 1

|  | BET Specific surface area [m²g⁻¹] | Pore volume [cm³g⁻¹] | Tap density [gcm⁻³] |
|---|---|---|---|
| CMTO | 140 | 0.20 | 0.50 |
| Commercially available SnO$_2$ | 5.36 | 0.011 | 1.5 |

Examples 3 to 6

[1. Preparation of a Sample]
[1.1. Preparation of Connected Starburst Silica (Radial Pores)]

In a manner similar to that of Example 1, Connected Starburst Silica (radial pores, CSS) was prepared.

[1.2. Preparation of Connected Starburst Carbon (Radial Pores)]

In a manner similar to that of Example 1 except that the polymerization conditions of FA were changed to 150° C. for 18 hours, Connected Starburst Carbon (radial pores, CSC) was obtained. The porous body thus obtained had a BET specific surface area of 2122 m²/g, a pore volume of 1.3 mL/g, and a pore diameter of 2.2 nm.

[1.3. Preparation of Connected Mesoporous M-SnO$_2$]

Figure 10:
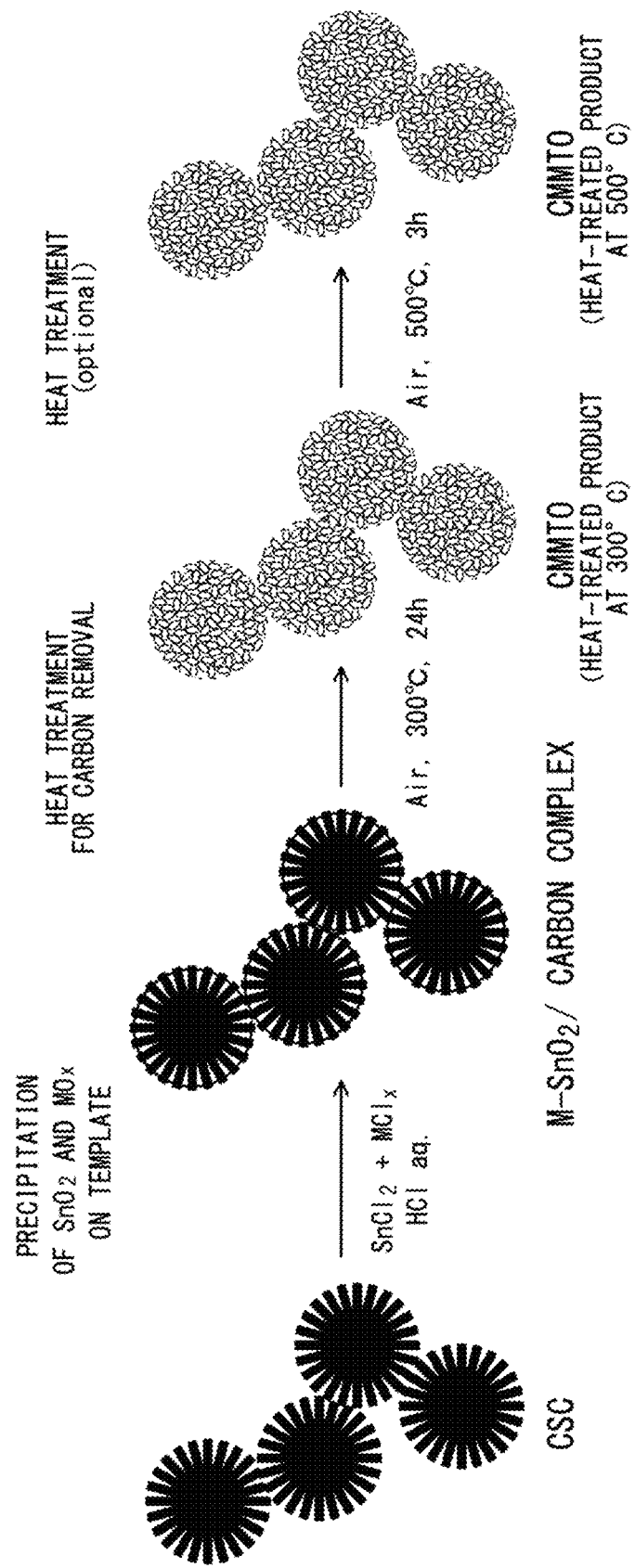
FIG. 10 is a schematic view of a method of manufacturing connected mesoporous M-$SnO_2$.

FIG. 10 illustrates a schematic view of a method of manufacturing connected mesoporous M-SnO$_2$. Connected mesoporous M-SnO$_2$ was prepared in accordance with the procedure shown in FIG. 10.

1.3.1. Example 3: Connected Mesoporous Sb—SnO$_2$

After 0.03 g of SbCl$_3$ was dissolved in 4 mL of concentrated hydrochloric acid (35 mass %) and 36 mL of purified water was added to dilute the resulting solution, 5.0 g of SnCl$_2$ was dissolved in the diluted solution. To the resulting solution was added 0.1 g of CSC to disperse it therein and the resulting dispersion was stirred in the air for 2 hours. Then, 200 mL of purified water was added and the resulting mixture was stirred in the air for further 4 hours. After filtration and redispersion in purified water were repeated twice, the resulting dispersion was dried at 45° C. to obtain a connected Sb—SnO$_2$/carbon complex.

The resulting connected Sb—SnO$_2$/carbon complex was treated at 300° C. for 24 hours in the air atmosphere to obtain connected mesoporous Sb—SnO$_2$ (CMSbTO, heat-treated product at 300° C.). The CMSbTO heat-treated at 300° C. was treated further at 500° C. for 3 hours in the air atmosphere to obtain connected mesoporous Sb—SnO$_2$ (CMSbTO, heat-treated product at 500° C.)

1.3.2. Example 4: Connected Mesoporous Nb—SnO$_2$

A mixed solution containing 250 mL of purified water, 4 mL of concentrated hydrochloric acid (35 mass %), 5.0 g of SnCl$_2$, and 0.074 g of NbCl$_2$ was prepared. In the resulting mixed solution was dispersed 0.1 g of CSC, followed by stirring at room temperature for 4 hours in the air. Then, after filtration and redispersion in purified water were repeated twice, the resulting dispersion was dried at 45° C. to obtain a connected Nb—SnO$_2$/carbon complex.

The resulting connected Nb—SnO$_2$/carbon complex was treated at 300° C. for 24 hours in the air atmosphere to obtain connected mesoporous Nb—SnO$_2$ (CMNbTO, heat-treated product at 300° C.). The CMNbTO heat-treated at 300° C. was treated further at 500° C. for 3 hours in the air atmosphere to obtain connected mesoporous Nb—SnO$_2$ (CMNbTO, heat-treated product at 500° C.)

1.3.3. Example 5: Connected Mesoporous Ta—SnO$_2$

A mixed solution containing 250 mL of purified water, 4 mL of concentrated hydrochloric acid (35 mass %), 5.0 g of SnCl$_2$, and 0.1 g of TaCl$_2$ was prepared. In the resulting mixed solution was dispersed g of CSC, followed by stirring at room temperature for 4 hours in the air. Then, after filtration and redispersion in purified water were repeated twice, the resulting dispersion was dried at 45° C. to obtain a connected Ta—SnO$_2$/carbon complex.

The resulting connected Ta—SnO$_2$/carbon complex was treated at 300° C. for 24 hours in the air atmosphere to obtain connected mesoporous Ta—SnO$_2$ (CMTaTO, heat-treated product at 300° C.). The CMTaTO heat-treated at 300° C. was treated further at 500° C. for 3 hours in the air atmosphere to obtain connected mesoporous Ta—SnO$_2$ (CMTaTO, heat-treated product at 500° C.)

1.3.4. Example 6: Connected Mesoporous W—SnO$_2$

In 4 mL of concentrated hydrochloric acid (35 mass %) was dissolved 0.052 g of WCl$_6$. The resulting solution was diluted with 3 mL of purified water and then, 5.0 g of SnCl$_2$ was dissolved in the diluted solution. To the resulting solution was added 0.1 g of CSC to disperse it therein and the resulting dispersion was stirred at room temperature for 2 hours in the air. Then, 240 mL of purified water was added and the resulting mixture was stirred further for 4 hours in the air. After filtration and redispersion in purified water were repeated twice, the resulting dispersion was dried at 45° C. to obtain a connected W—SnO$_2$/carbon complex.

The resulting connected W—SnO$_2$/carbon complex was treated at 300° C. for 24 hours in the air atmosphere to obtain connected mesoporous W—SnO$_2$ (CMWTO, heat-treated product at 300° C.). The CMWTO heat-treated at 300° C. was treated further at 500° C. for 3 hours in the air atmosphere to obtain connected mesoporous W—SnO$_2$ (CMWTO, heat-treated product at 500° C.)

[2. Test Method]
[2.1. SEM Observation]

The connected mesoporous M-SnO$_2$ (M representing Sb, Nb, Ta, or W) was subjected to SEM observation.

[2.2. XRD Measurement]

The connected mesoporous M-SnO$_2$ (M representing Sb, Nb, Ta, or W) was subjected to XRD measurement. The crystallite diameter was estimated from the peak width of the XRD pattern by using Scherrer's formula.

[2.3. N$_2$ Adsorption Measurement]

The N$_2$ adsorption measurement of the connected mesoporous M-SnO$_2$ (M representing Sb, Nb, Ta, or W) was performed. From the N$_2$ adsorption isotherm, the pore diameter distribution was found by BJH method and the mode pore diameter (most frequent value of the pore diameter) was determined as the pore diameter of the sample.

[2.4. Measurement of Conductivity]

In a manner similar to that of Example 1, the conductivity of the connected mesoporous M-SnO$_2$ (M representing Sb, Nb, Ta, or W) was measured.

[3. Results]

[3.1. SEM Observation]

Figure 11:
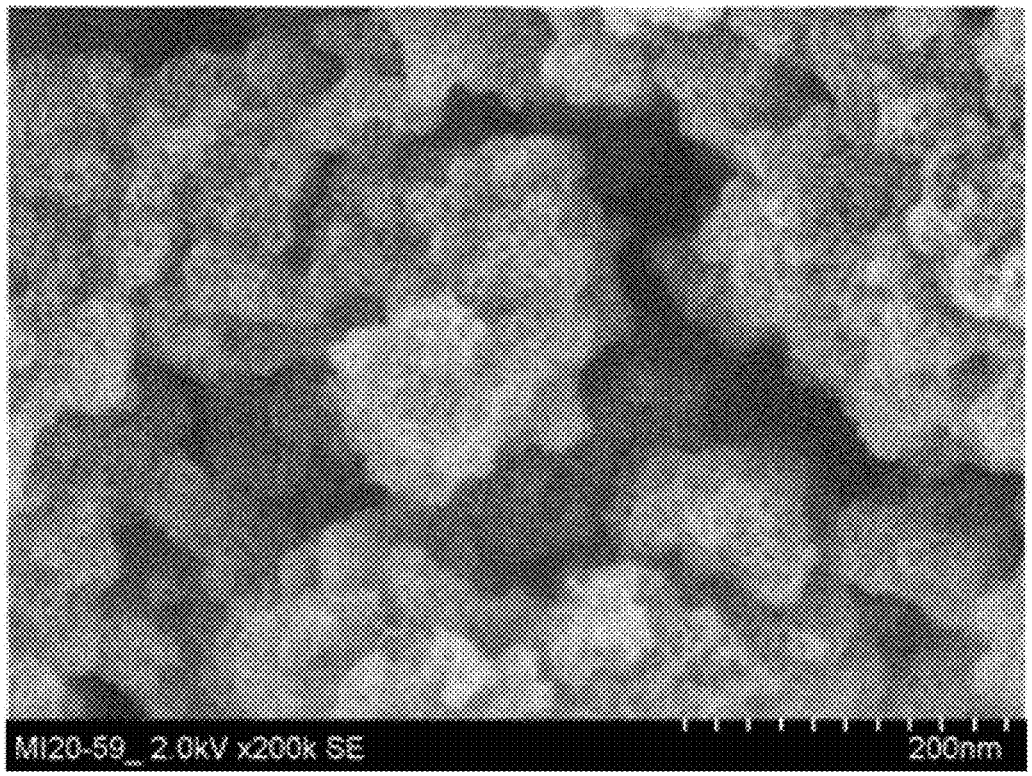
FIG. 11 is the SEM image of connected mesoporous Sb—$SnO_2$ (CMSbTO) (heat-treated product at 300° C.)
Figure 12:
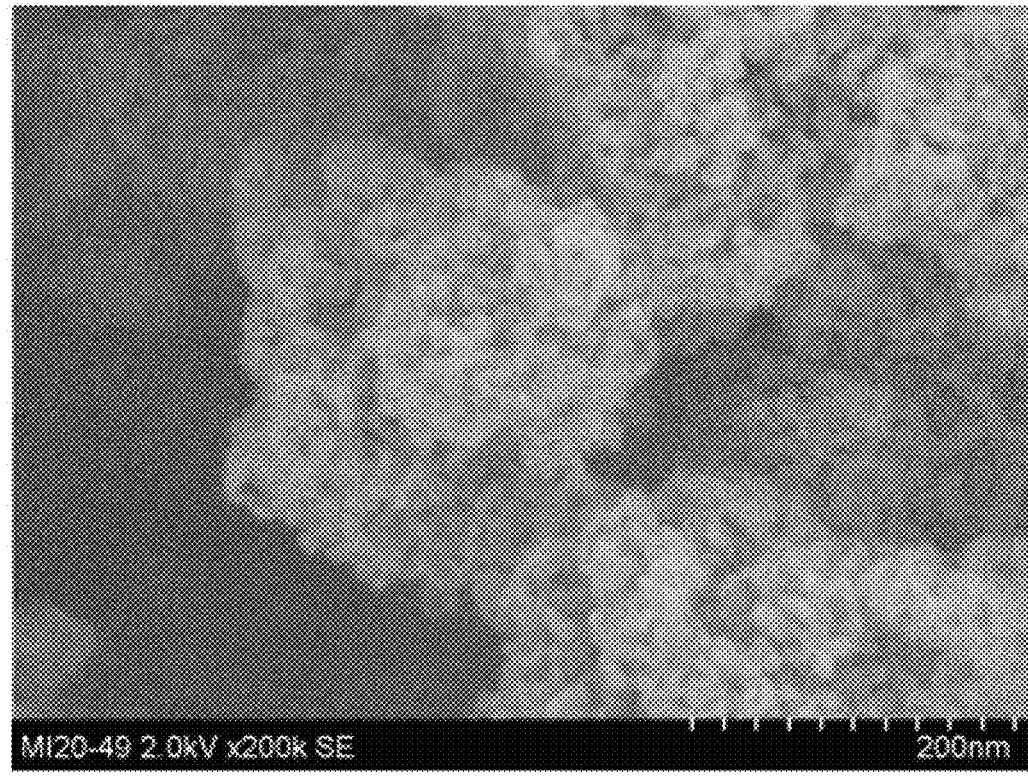
FIG. 12 is the SEM image of connected mesoporous Sb—$SnO_2$ (CMSbTO) (heat-treated product at 500° C.)

FIG. 11 shows the SEM image of connected mesoporous Sb—SnO$_2$ (CMSbTO) (heat-treated product at 300° C.). FIG. 12 shows the SEM image of connected mesoporous Sb—SnO$_2$ (CMSbTO) (heat-treated product at 500° C.). From FIGS. 11 and 12, a structure in which porous Sb—SnO$_2$ particles having a diameter of about 100 nm are connected to each other in a bead shape is recognized.

[3.2. XRD Measurement]

Figure 13:
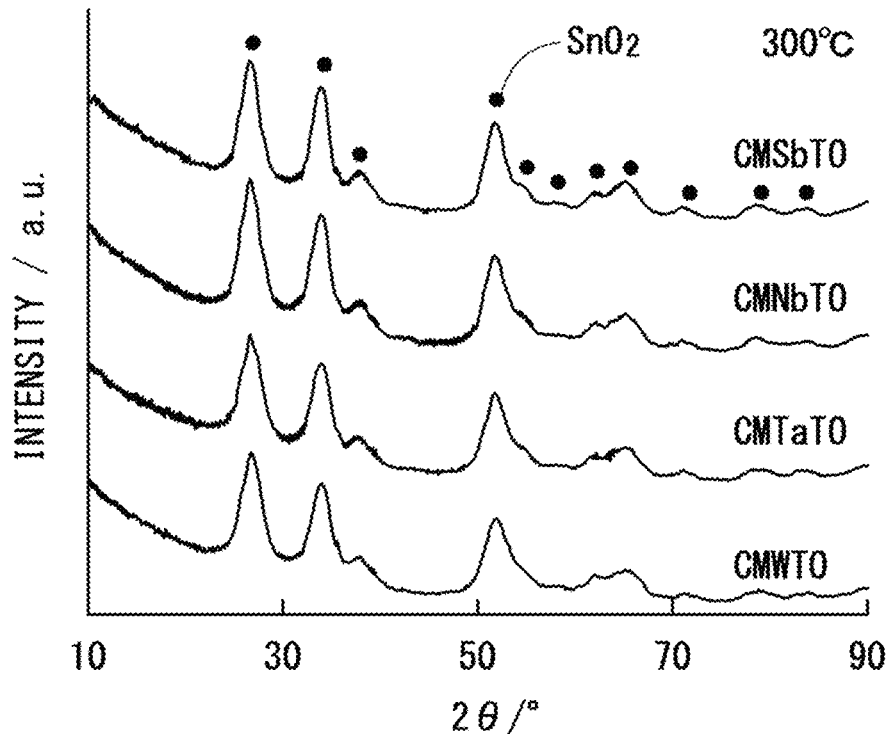
FIG. 13 is the XRD pattern of connected mesoporous M-$SnO_2$ (heat-treated product at 300° C.)
Figure 14:
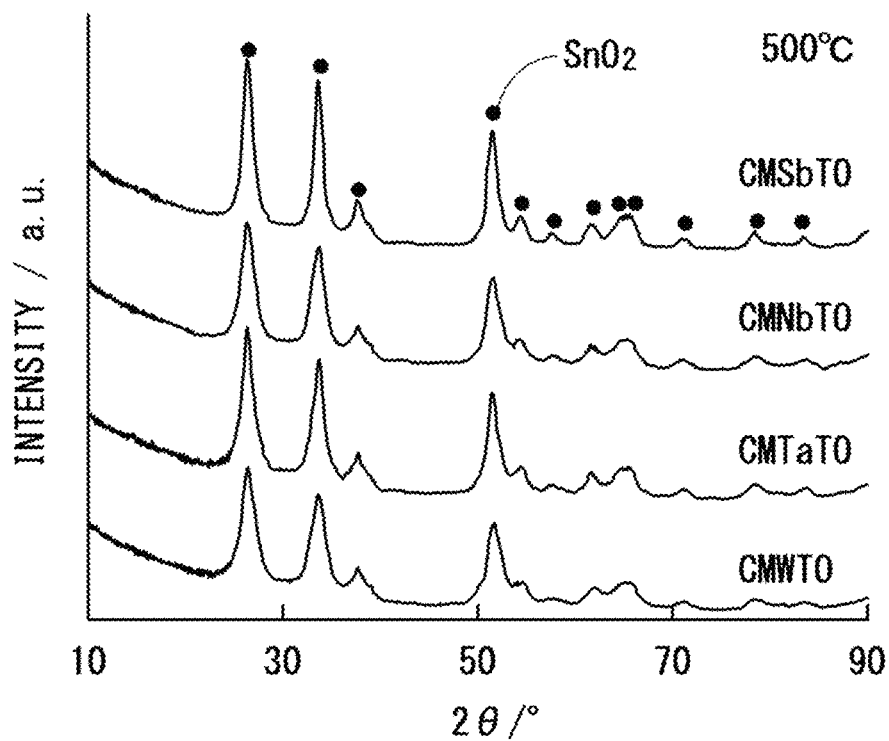
FIG. 14 is the XRD pattern of connected mesoporous M-$SnO_2$ (heat-treated product at 500° C.)

FIG. 13 shows the XRD pattern of connected mesoporous M-SnO$_2$ (heat-treated product at 300° C.). FIG. 14 shows the XRD pattern of connected mesoporous M-SnO$_2$ (heat-treated product at 500° C.). From both the heat-treated product at 300° C. and the heat-treated product at 500° C., only a peak attributable to the SnO$_2$ (rutile type structure) was found and a peak derived from another oxide was not found, regardless that what element they were doped with. This suggests that regardless that what element they were doped with, the doping element may form a solid solution in SnO$_2$.

[3.3. Measurement of N$_2$ Adsorption and Conductivity]

Figure 15:
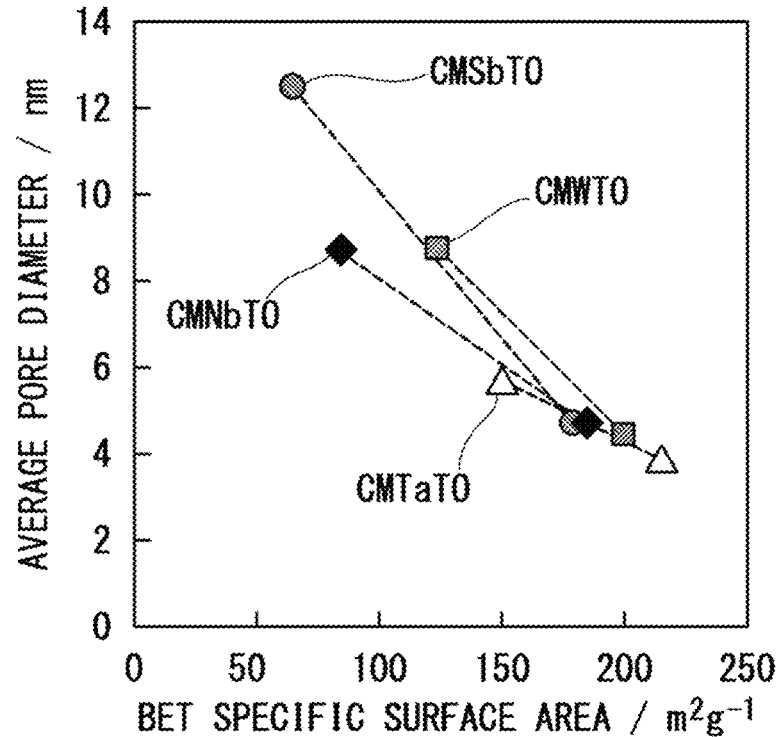
FIG. 15 is a graph showing the relation between BET specific surface area and pore diameter of connected mesoporous M-$SnO_2$.
Figure 16:
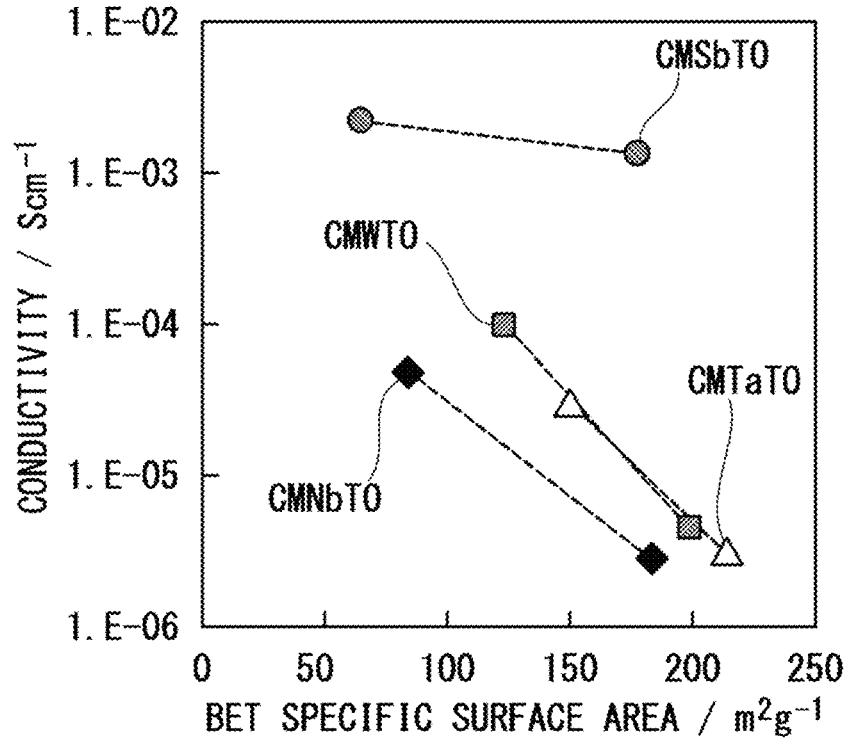
FIG. 16 is a graph showing the relation between BET specific surface area and conductivity of connected mesoporous M-$SnO_2$.

Table 2 collectively shows the physical property values of the connected mesoporous M-SnO$_2$. FIG. 15 shows the relation between BET specific surface area and pore diameter of connected mesoporous M-SnO$_2$. FIG. 16 shows the relation between BET specific surface area and conductivity of connected mesoporous M-SnO$_2$. From Table 2 and FIGS. 15 and 16, the following can be understood.

(1) The BET specific surface area and pore diameter of the heat-treated product at 300° C. showed little difference due to the doping elements. The BET specific surface area was 173 to 215 m$^2$/g and the pore diameter was 3.9 to 4.7 nm. On the other hand, the BET specific surface area and pore diameter of the heat-treated product at 500° C. showed large difference due to the doping elements.

The BET specific surface area and pore diameter of the CMTaTO obtained by doping with Ta and heat-treated at 500° C. were 150 m$^2$/g and 5.7 nm, respectively. On the other hand, the BET specific surface area and pore diameter of the CMSbTO obtained by doping with Sb and heat-treated at 500° C. were 64 m$^2$/g and 12.5 nm, respectively.

In any case, the higher the heat treatment temperature, the smaller the BET specific surface area and the larger the pore diameter. In addition, a certain relation was recognized between the BET specific surface area and the pore diameter, regardless of the doping element used (FIG. 15).

(2) The conductivity of any of the heat-treated CMNbTO, CMTaTO, and CMWTO at 300° C. was an order of 10$^{-6}$ S/cm and that of CMSbTO was 1.6×10$^{-3}$ S/cm. The conductivity of CMSbTO was an order of magnitude higher than that of, for example, Nb—SnO$_2$ particles reported in Non-Patent Literature 2.

The conductivity of the heat-treated CMNbTO, CMTaTO, and CMWTO at 500° C. was about an order of magnitude higher than that of the heat-treated products at 300° C. The conductivity of the heat-treated products at 500° C. did not reach that of the heat-treated CMSbTO at 300° C. (FIG. 16).

This has revealed that a product obtained by doping with Sb and firing at a low temperature has a pore diameter of about 5 nm, a high specific surface area (150 m$^2$/g or more), and a high conductivity (1×10$^{-3}$ S/cm or more).

TABLE 2

| | Firing temperature [° C.] | Crystallite diameter [nm] | BET specific surface area [m$^2$g$^{-1}$] | Pore volume [ccg$^{-1}$] | Pore diameter [nm] | Conductivity [Scm$^{-1}$] |
|---|---|---|---|---|---|---|
| CMSbTO | 300 | 4.1 | 173 | 0.24 | 4.7 | 1.3 × 10$^{-3}$ |
| | 500 | 8.1 | 64 | 0.19 | 12.5 | 2.1 × 10$^{-2}$ |
| CMNbTO | 300 | 4.1 | 184 | 0.25 | 4.7 | 2.7 × 10$^{-6}$ |
| | 500 | 6.0 | 94 | 0.22 | 8.7 | 4.7 × 10$^{-5}$ |
| CMTaTO | 300 | 3.7 | 215 | 0.25 | 3.9 | 3.0 × 10$^{-6}$ |
| | 500 | 4.1 | 150 | 0.22 | 5.7 | 2.8 × 10$^{-5}$ |
| CMWTO | 300 | 3.8 | 200 | 0.25 | 4.4 | 4.3 × 10$^{-6}$ |
| | 500 | 5.8 | 124 | 0.25 | 8.7 | 9.3 × 10$^{-5}$ |

Details of the embodiments of the present invention have heretofore been described above, but the present invention is not limited by them at all and can be modified variously without departing from the gist of the present invention.

The porous oxide semiconductor particles according to the present invention can be used as a catalyst support of a cathode (an air electrode) catalyst layer or as a catalyst support of an anode (a fuel electrode) catalyst layer of a polymer electrolyte fuel cell.

What is claimed is:

1. Porous oxide semiconductor particles comprising a connected structure in which porous primary particles are connected to each other, wherein:
    a specific surface area of the porous oxide semiconductor particles is 60 m$^2$/g or more,
    an average crystallite diameter of the porous oxide semiconductor particles is 2 nm or more and 8.1 nm or less, and
    each of the porous primary particles comprises an aggregate of crystallites composed of an oxide semiconductor.

2. The porous oxide semiconductor particles according to claim 1, wherein a pore diameter of the porous oxide semiconductor particles is 1 nm or more and 20 nm or less.

3. The porous oxide semiconductor particles according to claim 1, wherein a conductivity of a green compact composed of the porous oxide semiconductor particles is 1×10$^{-5}$ S/cm or more.

4. The porous oxide semiconductor particles according to claim 1, wherein an average particle diameter of primary particles is 0.05 μm or more and 2 μm or less.

5. The porous oxide semiconductor particles according to claim 1, wherein a pore volume of the porous oxide semiconductor particles is 0.1 mL/g or more.

6. The porous oxide semiconductor particles according to claim 1, wherein a tap density of the porous oxide semiconductor particles is 0.005 g/cm$^3$ or more and 1.0 g/cm$^3$ or less.

7. The porous oxide semiconductor particles according to claim 1,
    wherein the oxide semiconductor comprises:
    (a) SnO$_2$ or
    (b) SnO$_2$ doped with any one or more elements selected from the group consisting of Nb, Sb, W, Ta, and Al.

8. The porous oxide semiconductor particles according to claim 1, wherein the oxide semiconductor comprises Sb-doped SnO$_2$, and
    a conductivity of a green compact composed of the porous oxide semiconductor particles is 1×10$^{-3}$ S/cm or more.

9. The porous oxide semiconductor particles according to claim 1 to be used as a catalyst support of a polymer electrolyte fuel cell.

\* \* \* \* \*